US010232512B2

(12) United States Patent
Ooba et al.

(10) Patent No.: US 10,232,512 B2
(45) Date of Patent: Mar. 19, 2019

(54) COORDINATE SYSTEM SETTING METHOD, COORDINATE SYSTEM SETTING APPARATUS, AND ROBOT SYSTEM PROVIDED WITH COORDINATE SYSTEM SETTING APPARATUS

(71) Applicant: FANUC CORPORATION, Minamitsuru-gun, Yamanashi (JP)

(72) Inventors: Masafumi Ooba, Yamanashi (JP); Ichiro Kanno, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 151 days.

(21) Appl. No.: 15/254,022

(22) Filed: Sep. 1, 2016

(65) Prior Publication Data

US 2017/0066133 A1 Mar. 9, 2017

(30) Foreign Application Priority Data

Sep. 3, 2015 (JP) ................. 2015-173795

(51) Int. Cl.
*G05B 19/418* (2006.01)
*B25J 9/16* (2006.01)

(52) U.S. Cl.
CPC ........ *B25J 9/1697* (2013.01); *G05B 19/4182* (2013.01); *G05B 2219/39106* (2013.01); *G05B 2219/40554* (2013.01)

(58) Field of Classification Search
CPC ............ G05B 2219/40554; G05B 2219/40607
See application file for complete search history.

(56) References Cited

U.S. PATENT DOCUMENTS

| 5,096,353 | A | * | 3/1992 | Tesh | B25J 19/023 |
| | | | | | 348/86 |
| 6,646,404 | B2 | | 11/2003 | Okuyama et al. | |
| 9,259,289 | B2 | * | 2/2016 | Zhao | B25J 9/1689 |
| 9,783,371 | B2 | * | 10/2017 | Ooba | B65G 37/00 |
| 9,850,086 | B2 | * | 12/2017 | Smeyers | B65H 5/021 |

(Continued)

FOREIGN PATENT DOCUMENTS

| JP | H09-131683 A | 5/1997 |
| JP | H11320465 A | 11/1999 |

(Continued)

*Primary Examiner* — Ryan Rink
(74) *Attorney, Agent, or Firm* — RatnerPrestia

(57) ABSTRACT

An apparatus for setting a conveyor coordinate system in a robot system. The apparatus includes features provided on a movable part of a conveyor; a sensor provided on a robot; a first coordinate acquiring section for making the sensor detect positions of two features, when the movable part is in a first position, and acquiring two first coordinates in a base coordinate system of the robot; a conveying operation executing section for making the movable part perform a conveying operation from the first position toward a second position; a second coordinate acquiring section for making the sensor detect a position of one feature, when the movable part is in the second position, and acquiring one second coordinate in the base coordinate system; and a coordinate system determining section for determining the conveyor coordinate system based on a conveying operation direction, two first coordinates and one second coordinate.

10 Claims, 18 Drawing Sheets

(56) References Cited

U.S. PATENT DOCUMENTS

| | | | |
|---|---|---|---|
| 9,870,498 B2* | 1/2018 | Reynolds | G06K 7/10722 |
| 9,961,816 B2* | 5/2018 | Fujita | H05K 13/0404 |
| 2002/0105296 A1* | 8/2002 | Okuyama | B25J 9/1669 |
| | | | 318/568.16 |
| 2007/0073439 A1* | 3/2007 | Habibi | B25J 9/1697 |
| | | | 700/213 |
| 2007/0293987 A1* | 12/2007 | Yamada | B25J 13/06 |
| | | | 700/245 |
| 2008/0250636 A1* | 10/2008 | Okuda | H05K 13/08 |
| | | | 29/834 |
| 2009/0095047 A1* | 4/2009 | Patel | G06K 7/10722 |
| | | | 73/1.01 |
| 2010/0232681 A1* | 9/2010 | Fujieda | G06T 7/85 |
| | | | 382/154 |
| 2012/0229620 A1* | 9/2012 | Ikeda | B25J 9/1697 |
| | | | 348/94 |
| 2012/0236140 A1 | 9/2012 | Hazeyama et al. | |
| 2013/0086801 A1* | 4/2013 | Mimura | B23P 21/00 |
| | | | 29/720 |
| 2013/0103192 A1 | 4/2013 | Huettenhofer | |
| 2014/0088765 A1* | 3/2014 | Valpola | B25J 9/1697 |
| | | | 700/259 |
| 2014/0109779 A1* | 4/2014 | Miyake | H05K 3/1233 |
| | | | 101/113 |
| 2015/0036876 A1* | 2/2015 | Marrion | G06K 9/2054 |
| | | | 382/103 |
| 2016/0183419 A1* | 6/2016 | Fujita | H05K 13/0452 |
| | | | 29/739 |
| 2017/0116738 A1* | 4/2017 | Iida | H04N 13/0221 |
| 2017/0139407 A1* | 5/2017 | Sakaguchi | G05B 19/41885 |
| 2018/0243911 A1* | 8/2018 | Harada | B25J 9/1692 |

FOREIGN PATENT DOCUMENTS

| | | |
|---|---|---|
| JP | 2001121461 A | 5/2001 |
| JP | 2002192486 A | 7/2002 |
| JP | 2005149299 A | 6/2005 |
| JP | 3733364 B | 1/2006 |
| JP | 2008003713 A | 1/2008 |
| JP | 2008023689 A | 2/2008 |
| JP | 2011036975 A | 2/2011 |
| JP | 2012187651 A | 10/2012 |
| JP | 2012192466 A | 10/2012 |

* cited by examiner

COORDINATE SYSTEM SETTING METHOD, COORDINATE SYSTEM SETTING APPARATUS, AND ROBOT SYSTEM PROVIDED WITH COORDINATE SYSTEM SETTING APPARATUS

BACKGROUND OF THE INVENTION

1. Field of the Invention

The present invention relates to a method and an apparatus, for setting a coordinate system (in particular, a conveyor coordinate system). The present invention also relates to a robot system provided with a coordinate system setting apparatus.

2. Description of the Related Art

A system configured so that a sensor (e.g., a vision sensor) detects a position of an article conveyed by a conveyor and a robot picks up the article from the conveyor based on the detected position, has been known. Further, a system configured so that a sensor (e.g., a phototube sensor) detects a position of an article tray conveyed by a conveyor and a robot places an article on the article tray based on the detected position, has also been known. In this type of robot system, in general, a coordinate system (in the present application, referred to as a "conveyor coordinate system") having a predetermined relationship with a base coordinate system of a robot is set as a coordinate system provided for a conveyor for defining a position of an article and/or an article tray (in the present application, referred to generically as an "object") on the conveyor.

For example, Japanese Unexamined Patent Publication No. H9-131683 A (JP H9-131683 A) discloses a vision sensor and robot system configured so that a vision sensor recognizes the positions of a plurality of workpieces conveyed by a conveyor and each of a plurality of robots picks up a workpiece by a tracking operation based on a recognized position. In this system, a tracking coordinate system configured to be displaced at a speed equal to and a direction identical to those of the conveyor is set as a coordinate system for defining the position of the workpiece on the conveyor. The tracking coordinate system is provided, at an initial position, with the origin spaced upstream from the base coordinate system of the robot by a predetermined distance, and is set in such a manner that its X-axis coincides with the running direction of the conveyor.

On the other hand, in a robot system including a robot and a conveyor, as a result of a supplementary work performed for the robot system which has already been established, such as maintenance on the robot and/or conveyor, relocation of the entire system to another place, etc., sometimes a positional relationship between the robot and the conveyor changes between before and after performing the supplementary work. If the positional relationship between the robot and the conveyor changes, it is necessary to correct an operation taught point which has been taught to the robot before performing the supplementary work, in accordance with the change of the positional relationship after performing the supplementary work. For example, Japanese Patent No. 3733364 B (JP 3733364 B) discloses a method of correcting a taught position, configured so that a vision sensor measures three-dimensional positions of at least three points defined on an object to be worked (i.e., a workpiece) or on a holder thereof, before and after the relocation of the robot system is performed, and positions of taught points provided in a robot operation program, which have been taught before performing the relocation, are corrected, based on the measured positional data, so as to compensate for a change in a relative position of the robot to the workpiece, which has been caused between before and after performing the relocation.

SUMMARY OF THE INVENTION

In a system having a configuration in which a position of an object (e.g., an article, an article tray, etc.) conveyed by a conveyor is detected and a robot performs a work with respect to the object (e.g., a work of picking up an article from a conveyor, a work of placing an article on an article tray, etc.) based on a detected position, it is desired to make it easier to set, in a reproducible manner, a conveyor coordinate system for defining a position of the object on the conveyor. Further, in the case where a supplementary work, such as maintenance or system relocation, is performed for the aforementioned system which has already been established, it is desired to make it easier to execute a resetting of the conveyor coordinate system after performing the supplementary work.

One aspect of the present invention is a coordinate system setting method configured to set a conveyor coordinate system having a predetermined relationship with a base coordinate system of a robot, as a coordinate system for defining a position of an object on a conveyor, in a system having a configuration in which a position of the object conveyed by the conveyor is detected and the robot performs a work with respect to the object based on a detected position, the method comprising providing a movable part of the conveyor with a plurality of features having a fixed positional relationship with each other, the movable part performing an object conveying operation; providing the robot with a sensor able to detect a position of each of the plurality of features in a non-contact manner; detecting positions of at least two features by the sensor, when the movable part is located at a first operating position, and acquiring detected positions as at least two first coordinates in the base coordinate system; making the movable part perform the object conveying operation from the first operating position toward a second operating position; detecting a position of at least one feature by the sensor, when the movable part is located at the second operating position, and acquiring a detected position as at least one second coordinate in the base coordinate system; and determining the conveyor coordinate system based on a direction of the object conveying operation, the at least two first coordinates and the at least one second coordinate.

The above coordinate system setting method may be configures to further comprise setting a mark at a predetermined portion of an immovable part of the conveyor, the immovable part not performing the object conveying operation, a position of the mark being detectable by the sensor in a non-contact manner; detecting a position of the mark by the sensor, and acquiring a detected position as a third coordinate in the base coordinate system; and determining the conveyor coordinate system by using the third coordinate as an origin of the conveyor coordinate system.

Another aspect of the present invention is a coordinate system setting apparatus configured to set a conveyor coordinate system having a predetermined relationship with a base coordinate system of the robot, as a coordinate system for defining a position of an object on a conveyor, in a system having a configuration in which a position of the object conveyed by the conveyor is detected and the robot performs a work with respect to the object based on a detected position, the apparatus comprising a plurality of features having a fixed positional relationship with each other, the features being provided on a movable part of the conveyor, the movable part performing an object conveying operation; a sensor able to detect a position of each of the plurality of features in a non-contact manner, the sensor provided on the robot; a first coordinate acquiring section configured to make the sensor detect positions of at least two features, when the movable part is located at a first operating position, and acquire detected positions as at least two first coordinates in the base coordinate system; a conveying operation executing section configured to make the movable part perform the object conveying operation from the first operating position toward a second operating position; a second coordinate acquiring section configured to make the sensor detect a position of at least one feature, when the movable part is located at the second operating position, and acquire a detected position as at least one second coordinate in the base coordinate system; and a coordinate system determining section configured to determine the conveyor coordinate system based on a direction of the object conveying operation, the at least two first coordinates and the at least one second coordinate.

Still another aspect of the present invention is a robot system comprising a conveyor; an object detecting section configured to detect a position of an object conveyed by the conveyor; a robot configured to perform a work with respect to the object based on the position detected by the object detecting section; and the aforementioned coordinate system setting apparatus.

According to the coordinate system setting method of one aspect, and according to a coordinate system setting apparatus of the other aspect, it is possible to set the conveyor coordinate system by simply making the conveyor provided with the plurality of features perform the object conveying operation from the first operating position to the second operating position, and by simply making the sensor provided on the robot detect the position of at least two features in the first operating position and the position of at least one feature in the second operating position. Therefore, it is possible to easily set the conveyor coordinate system in a reproducible manner without requiring operator's skill.

Further, according to the robot system of the still other aspect, which includes the aforementioned coordinate system setting apparatus, it is possible to easily set the conveyor coordinate system in a reproducible manner without requiring operator's skill.

BRIEF DESCRIPTION OF THE DRAWINGS

The objects, features and advantages of the present invention will become more apparent from the following description of the embodiments in connection with the accompanying drawings, wherein.

DETAILED DESCRIPTION

Figure 1:
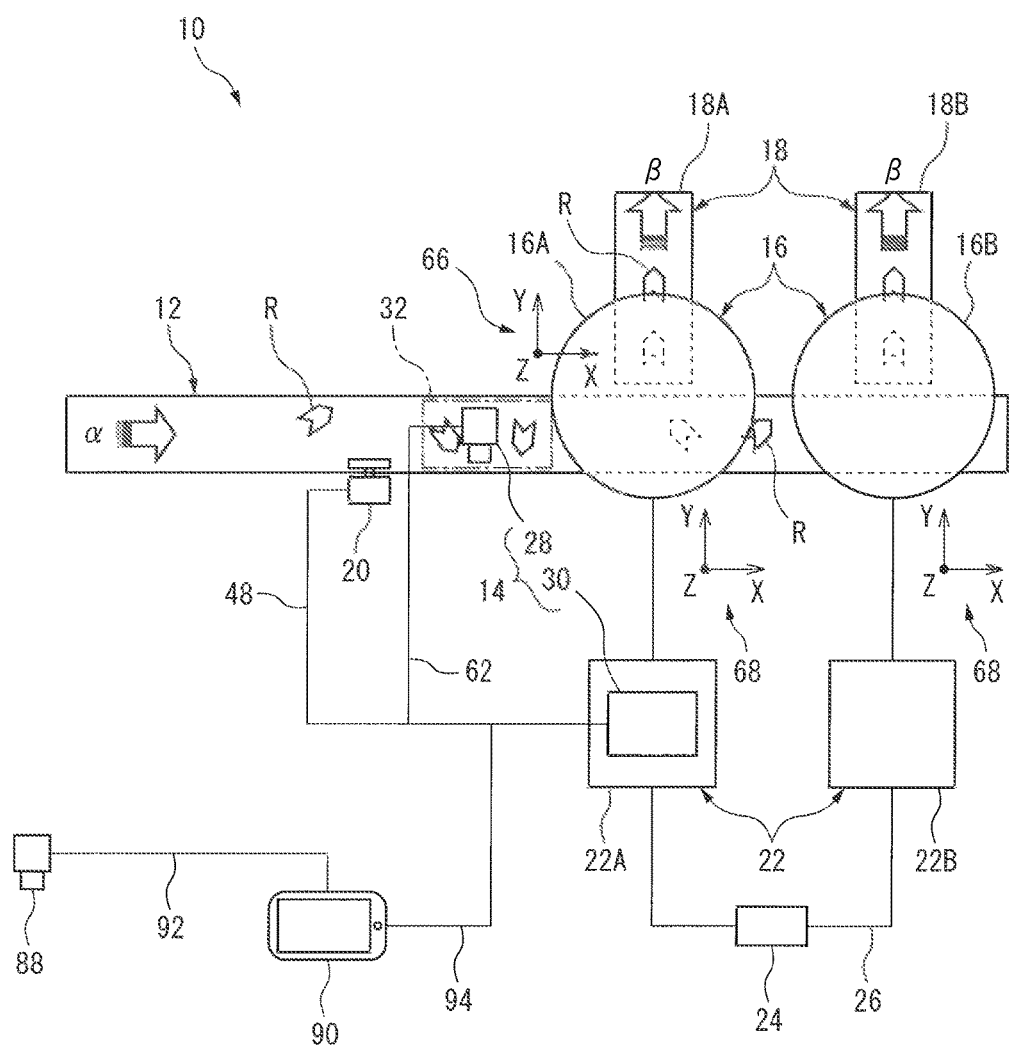
FIG. 1 is a plan view schematically showing the configuration of one embodiment of a robot system.

Embodiments of the present invention will be described below with reference to the accompanying drawings. Throughout the drawings, corresponding components are denoted by common reference numerals.

FIG. 1 schematically shows the configuration of one embodiment of a robot system according to one aspect of the present invention. The robot system 10 according to this embodiment includes a conveyor 12, an object detecting section 14 configured to detect a position of an object conveyed by the conveyor 12, and a robot 16 configured to perform a work with respect the object based on the position of the object detected by the object detecting section 14.

In this embodiment, the conveyor 12 is formed as an article feed conveyor 12 configured to convey a plurality of articles R (i.e., objects) toward a working area of the robot 16. The object detecting section 14 has a configuration of a vision sensor configured to capture the image of an article R conveyed by the conveyor 12 and detect the position of the article R by image processing. The robot 16 performs a work of picking up the article R from the conveyor 12 and transferring the article to another location, based on the position of the article R detected by the object detecting section 14. In the robot system 10, two robots 16A, 16B are arranged to be aligned in the direction of conveying operation of the conveyor 12, and two discharge conveyors 18A, 18B (referred to generically as a "discharge conveyor 18")

are arranged to be adjacent to the conveyor 12, to which the respective robots 16A, 16B transfer the articles R picked up from the conveyor 12.

The conveyor 12 includes a known conveyance member (i.e., a movable part) able to support the plurality of articles R in a suitable arrangement and convey them in one direction (in the drawing, the direction of an arrow α) and a known drive mechanism for driving the conveyance member in a continuous or intermittent manner. The robot system 10 is provided with a conveyor sensor 20 configured to obtain conveying operation information, such as an operating position, of the conveyor 12. The conveyor sensor 20 may include, e.g., an encoder able to detect a position and/or a speed of the conveyance member or the drive mechanism of the conveyor 12.

Each of the discharge conveyors 18A, 18B includes a known conveyance member (i.e., a movable part) able to support an article tray (not shown) on which the article R can be placed in a predetermined arrangement and convey it in one direction (in the drawing, the direction of an arrow β) and a known drive mechanism for driving the conveyance member in a continuous or intermittent manner. In this embodiment, the conveying operation direction α of the conveyor 12 is substantially perpendicular to the conveying operation direction β of the discharge conveyors 18A, 18B. The robot system 10 is further provided with a conveyor sensor (not shown) configured to obtain conveying operation information, such as an operating position of each discharge conveyor 18. The conveyor sensor may include, e.g., an encoder able to detect a position and/or a speed of the conveyance member or the drive mechanism of each discharge conveyor 18.

The robot 16 (first robot 16A, second robot 16B) may include a mechanical part (not shown) suitably selected from various known mechanical parts (i.e., manipulators), such as an articulated type, a gantry type, a parallel link type, etc., and a hand (not shown) suitably selected from various known hands, such as a suction type, a grip type, etc. The first robot 16A arranged at an upstream side in the conveying operation direction α of the conveyor 12 operates the mechanical part and the hand in the predetermined working area of the robot 16A so as to hold and pick up an arbitrary article R among the plurality of articles R conveyed by the conveyor 12 and transfer the picked-up article to the discharge conveyor 18A. The second robot 16B arranged at a downstream side in the conveying operation direction α of the conveyor 12 operates the mechanical part and the hand in the predetermined working area of the robot 16B so as to hold and pick up an article R which has not been picked up by the first robot 16A among the plurality of articles R conveyed by the conveyor 12 and transfer the picked-up article to the discharge conveyor 18B. The article R transferred to each discharge conveyor 18 is placed in a predetermined orientation at a predetermined location on the article tray (not shown) conveyed by the discharge conveyor 18, and is conveyed in the conveying operation direction β.

The robot system 10 includes a first controller 22A configured to control the first robot 16A and a second controller 22B configured to control the second robot 16B. The first controller 22A and the second controller 22B can communicate data with each other through a network hub 24 and a wired line or communication cable 26. Note that communicating means is not limited to the communication cable 26. Details of the hardware configuration of each controller 22A, 22B (referred generically to as a "controller 22") will be explained later.

The object detecting section 14 includes an image capturing section 28, such as a CCD camera, and an image processing section 30 configured to perform image processing on two-dimensional image data obtained by the image capturing section 28. The image capturing section 28 is disposed at the upstream side of the first robot 16A as viewed in the conveying operation direction α of the conveyor 12, and has a visual field 32 (shown by a dot-and-dash line) extending over a predetermined range in the conveying operation direction of the conveyor 12. The image capturing section 28 captures from above the image of an article R and a part of the conveyor 12, both existing in the visual field 32, and obtains the two-dimensional image data thereof. The image capturing section 28 may be formed as a digital camera, and may arbitrarily set a resolution and/or a shooting range.

The image processing section 30 makes the image capturing section 28 capture the image of the article R and the conveyor 12, existing in the visual field 32, and suitably processes the two-dimensional image data obtained by the image capturing section 28, so as to detect the presence of the article R and obtain information of the position (a coordinate value) and the orientation (a rotation angle), of a respective article R, in a predetermined three-dimensional coordinate system. The information obtained by the image processing section 30 usually includes information of the position and orientation of an article R, but sometimes need not include information of the orientation of an article R. In the present application, not only the information of the position and orientation of an article R but also the information of the position of an article R will be generically referred to as "positional information".

The image processing section 30 is configured as a function (i.e., hardware and software) of the first controller 22A. Alternatively, the image processing section 30 may be configured as an image processing apparatus independent from the first controller 22A. In either case, the positional information of an article R, obtained by the image processing section 30 from the two-dimensional image data of the image capturing section 28, is continually obtained by the first controller 22A and also continually obtained by the second controller 22B through the network hub 24 and the communication cable 26. Analogously, the conveying operation information of the conveyor 12, detected by the conveyor sensor 20, is continually obtained by the first controller 22A and also continually obtained by the second controller 22B through the network hub 24 and the communication cables 26.

Figure 2:
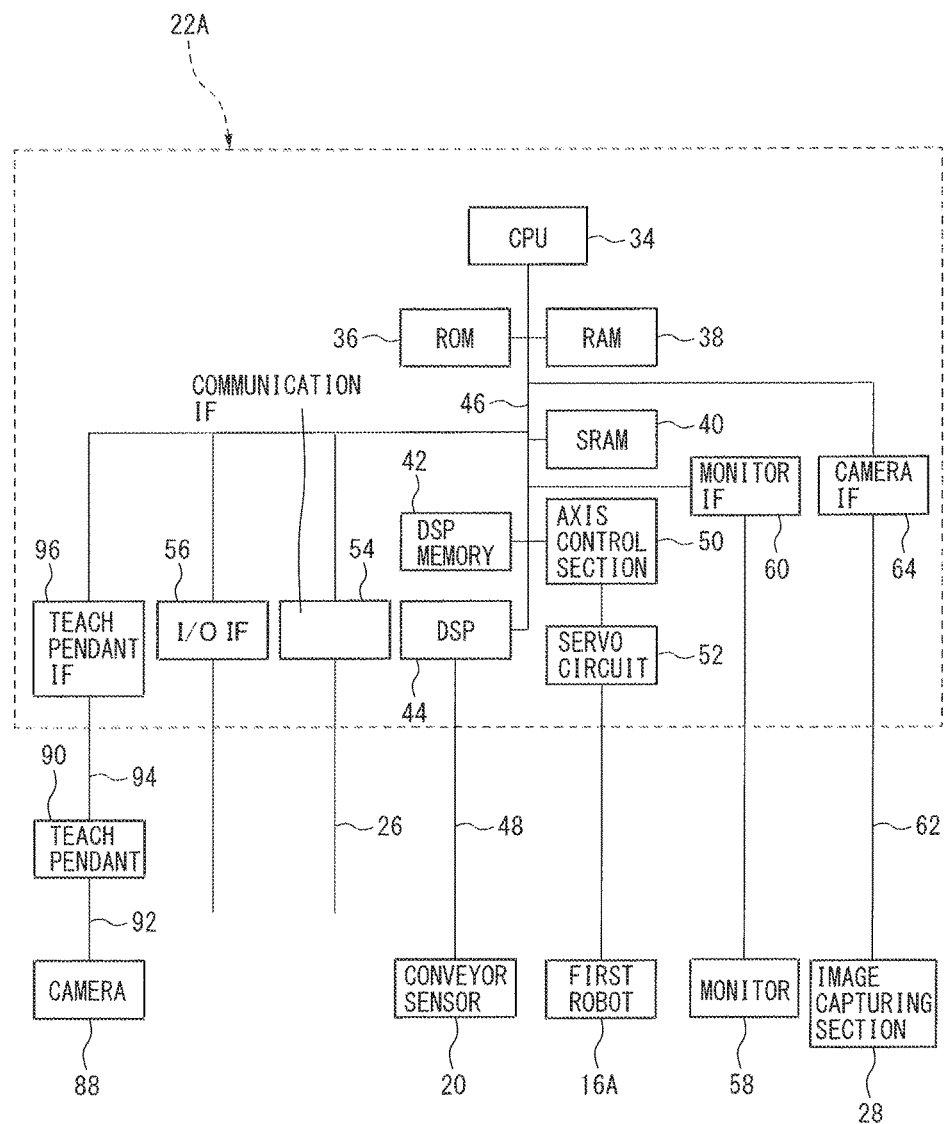
FIG. 2 is a block diagram showing one example of the hardware configuration of a controller of the robot system of FIG. 1.

FIG. 2 shows one example of the hardware configuration of the first controller 22A. The first controller 22A is provided with a CPU 34 comprised of a microprocessor. The CPU 34 is connected through a bus 46 to a ROM 36, a RAM 38, a SRAM 40, a data memory 42 for a digital signal processor (DSP), and a digital signal processor (DSP) 44, respectively. The ROM 36 stores a program for controlling the entire system. The RAM 38 temporarily stores data to be processed by the CPU 34. The SRAM 40 stores an operating program and/or setting data for the first robot 16A. The DSP 44 is a processor for processing the output signal of the conveyor sensor 20, and the DSP data memory 42 stores data processed by the DSP 44 and/or a setting parameter. The DSP 44 is connected through a cable 48 to the conveyor sensor 20, and has a function of detecting the output of the conveyor sensor 20 at an arbitrary point of time in accordance with a command from the CPU 34 and writing it to a predetermined area of the DSP data memory 42.

The first controller 22A includes an axis control section 50 for controlling the first robot 16A. The axis control section 50 is connected through a servo circuit 52 to the first robot 16A. Thus, the first controller 22A can control the operation of the mechanical part and/or the hand of the first robot 16A. Furthermore, the first controller 22A includes a communication interface 54 and an I/O interface 56, and can communicate through these IFs with the second controller 22S or other peripheral units.

The first controller 22A further includes a monitor interface 60 to which an outside-installed monitor 58 is connected and a camera interface 64 to which the image capturing section 28 is connected through the cable 62, as the components of the image processing section 30 (FIG. 1). The monitor interface 60 and the camera interface 64 are connected through the bus 46 to the CPU 34. The image captured by the image capturing section 28 is stored in the RAM 38 through the camera interface 64. The data stored in the RAM 38 is analyzed by the CPU 34 and obtained by the image processing section 30 as the positional information of an article R. The image processing section 30 also can obtain external feature information, such as a shape and/or a color, of an article R from the captured image data stored in the RAM 38. The ROM 36 stores various setting information and/or an analysis program, provided in the image processing section 30. In this way, the CPU 34, ROM 36 and RAM 38 are shared by the image processing section 30 and a robot control section including the axis control section 50.

The second controller 22B (FIG. 1) has a configuration analogous to the first controller 22A, except that is does not include the image processing section 30. More specifically, the second controller 22B includes a CPU 34, a ROM 36, a RAM 38, a SRAM 40, a DSP data memory 42, a DSP 44, a bus 46, an axis control section 50, a servo circuit 52, a communication interface 54 and an I/O interface 56.

As shown in FIG. 1, a three-dimensional conveyor coordinate system 66, the X-axis of which coincides with the conveying operation direction α, is set for the conveyor 12 as a coordinate system for defining the position of an article R on the conveyor 12. The conveyor coordinate system 66 is provided as a coordinate system displaceable in the direction of X-axis so as to follow the conveying operation of the conveyor 12. On the other hand, a three-dimensional base coordinate system 68 for defining the position and/or the orientation of the mechanical part and/or the hand is set for the robot 16 (first robot 16A, second robot 16B). When a mutual relationship concerning the position and orientation between the conveyor coordinate system 66 and the base coordinate system 68 is previously determined, it is possible for the first controller 22A to make the first robot 16A operate in the conveyor coordinate system 66 in accordance with a command provided in the conveyor coordinate system 66 so as to pick up an article R on the conveyor 12, and also for the second controller 22B to make the second robot 16B operate in the conveyor coordinate system 66 in accordance with a command provided in the conveyor coordinate system 66 so as to pick up an article R on the conveyor 12. Further, the object detecting section 14 can calibrate the image capturing section 28 in the conveyor coordinate system 66 and thereby express the positional information of a detected article R in the conveyor coordinate system 66.

The object detecting section 14 performs the image capturing and detection of a plurality of articles R moving by the object conveying operation of the conveyor 12, with a period "T" or at every regular conveyance distances "G", which enable(s) all of the plurality of articles R to be captured and detected, and obtains the positional information of each of all articles R in the conveyor coordinate system 66. The period T and the conveyance distance G are respectively defined as a period and a conveyance distance, which enables the image capturing section 28 to capture the entire image of each of the articles R at least once in the visual field 32.

As a specific example, in a configuration in which the length of the visual field 32 measured along the conveying operation direction α of the conveyor 12 (i.e., along the X-axis direction of the conveyor coordinate system 66) is 400 mm, the maximum width of an article R in a planar shape viewed from above the conveyor 12 is 100 mm, and the conveying speed of the conveyor 12 is 200 mm/s, the period "T" and the conveyance distance "G", which enables a single image-capturing of an article R during a time period from an instant when the entirety of one article R comes inside the visual field 32 to an instant when a part of the said article R comes outside the visual field 32 while following the object conveying operation of the conveyor 12, are calculated respectively as follows:

$$T=(400 \text{ (mm)}-100 \text{ (mm)})/200 \text{ (mm/s)}=1.5 \text{ (s)}$$

$$G=400 \text{ (mm)}-100 \text{ (mm)}=300 \text{ (mm)}$$

In the object detecting section 14, the image capturing section 28 captures the images of a plurality of articles R supplied by the conveyor 12 to the working areas of the first and the second robots 16A, 16B with the period T or at the every regular conveyance distances G, and thereby the image processing section 30 can detect all of the articles R during a time when they exist in the visual field 32 and obtain the positional information of each of the articles R.

The first controller 22A obtains the conveying operation information (the operating position, etc.) of the conveyor 12 detected by the conveyor sensor 20 in synchronization with the image capturing operation by the image capturing section 28 for the articles R with the period T or at the every conveyance distances G, and stores the information in the DSP data memory 42. Further, the first controller 22A generates a set of article information, which is formed by gathering together the positional information of the articles R detected with the period. T or at the every conveyance distances 5, the conveying operation information of the conveyor 12 obtained in synchronization with the period T or each conveyance distance G, and article IDs representing the articles R by serial numbers, and as needed, information obtained from sensors other than the object detecting section 14, etc. The first controller 22A compares continually updated conveying operation information sent from the conveyor sensor 20 in real time with the conveying operation information synchronized with the period T or the each conveyance distance G, contained in the article information set, and thereby makes it possible to recognize the current position of the article R in the conveyor coordinate system 66. The first controller 22A generates an operation command for the first robot 16A to hold and pick up an article R existing at the current position and controls the first robot 16A by the operation command, and thereby makes it possible for the first robot 16A to pick up the said article R. The first controller 22A deletes the positional information of the article R which has been picked up by the first robot 16A, and transfers the positional information of the article R which has not been picked up by the first robot 16A to the second controller 22B, from among the article information set which has been generated.

The second controller 22B operates, based on the article information set transferred from the first controller 22, and analogously to the first controller 22A, to compare the continually-updated real-time conveying operation information with the conveying operation information synchronized with the period T or the each conveyance distance C, contained in the article information set, and thereby makes it possible to recognize the current position of the article R which has not been picked up by the first robot 16A. The second controller 22B generates an operation command for the second robot 16B to hold and pick up an article R existing at the current position and controls the second robot 16B by the operation command, and thereby makes it possible for the second robot 163 to pick up the said article R. Note that the operation of holding and picking up the articles F by the first robot 16A and the second robot 16B may be performed as a tracking operation configured to track the object conveying operation of the conveyor 12, or may be performed in the state where the conveyor 12 is temporarily stopped.

In addition to the above configuration, the robot system 10 is provided with a coordinate system setting apparatus 70 (FIG. 3) configured to set a conveyor coordinate system 66 for defining a position of an object (or an article R) on the conveyor 12, which is conveyed by the conveyor 12. The configuration of the coordinate system setting apparatus 70, as one embodiment of a coordinate system setting apparatus according to another aspect of the present invention, will be explained below with reference to FIGS. 1 to 4.

Figure 3:
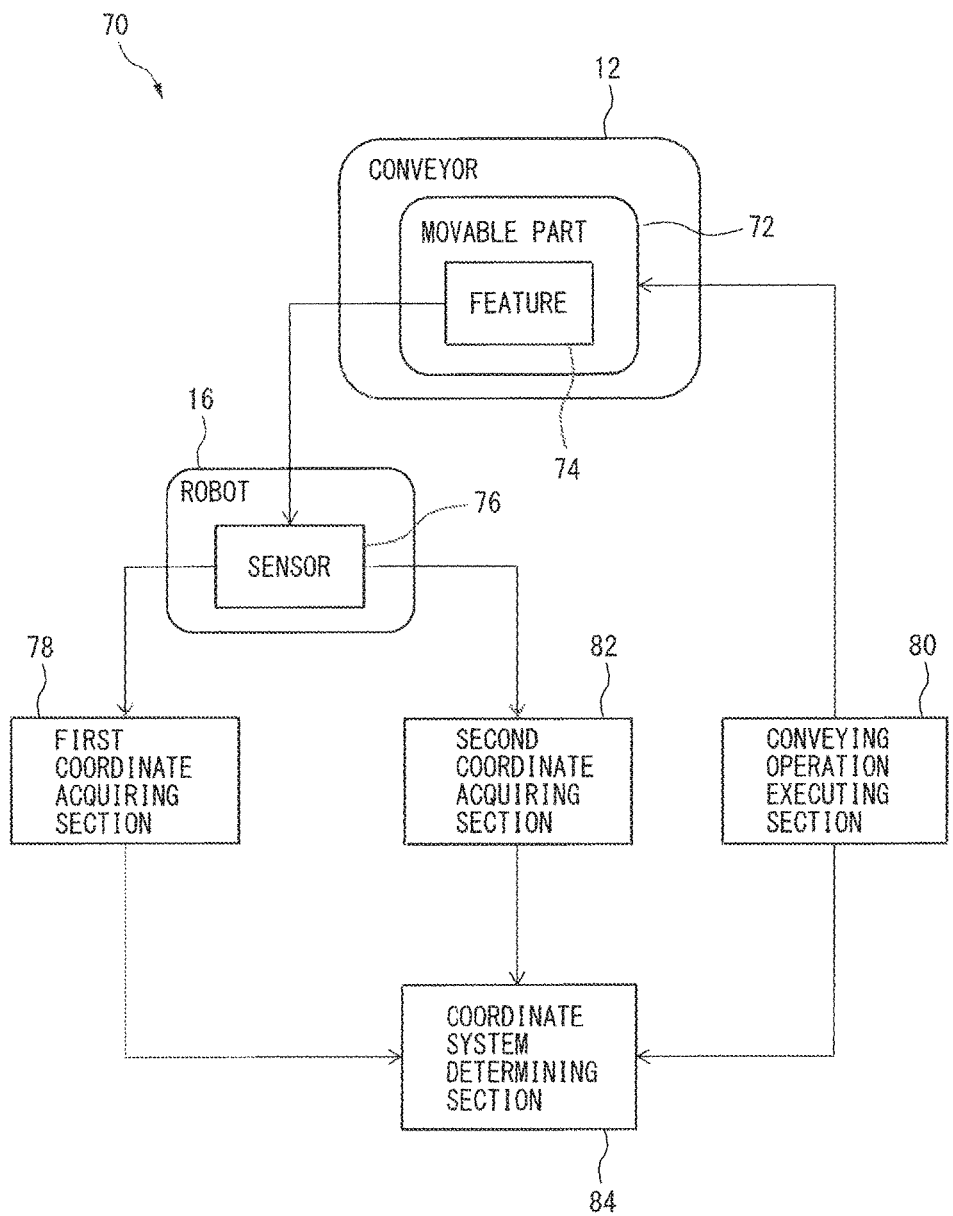
FIG. 3 is a functional block diagram showing the configuration of one embodiment of a coordinate system setting apparatus.

As shown in FIG. 3, the coordinate system setting apparatus 70 includes a plurality of features 74 having a fixed positional relationship with each other, the features 74 being provided on a movable part (i.e., a conveyance member) 72 of the conveyor 12, the movable part 72 performing an object conveying operation; a sensor 76 able to detect a position of each of the plurality of features 74 in a non-contact manner, the sensor 76 provided on the robot 16; a first coordinate acquiring section 78 configured to make the sensor 76 detect positions of at least two features 74, when the movable part 72 is located at a first operating position, and acquire detected positions as at least two first coordinates in the base coordinate system 68 (FIG. 1); a conveying operation executing section 80 configured to make the movable part 72 perform the object conveying operation from the first operating position toward a second operating position; a second coordinate acquiring section 82 configured to make the sensor 76 detect a position of at least one feature 74, when the movable part 72 is located at the second operating position, and acquire a detected position as at least one second coordinate in the base coordinate system 68; and a coordinate system determining section 84 configured to determine the conveyor coordinate system 66 (FIG. 1) based on a direction of the object conveying operation, the at least two first coordinates and the at least one second coordinate.

Figure 4:
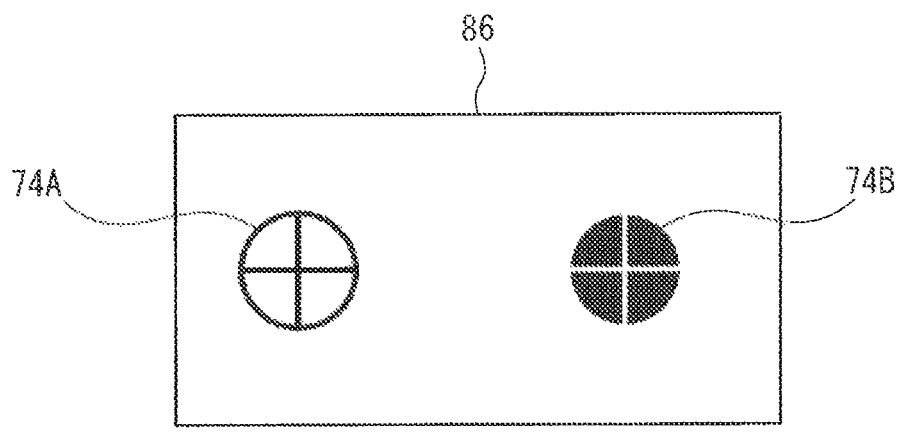
FIG. 4 is a plan view showing one example of a feature of the coordinate system setting apparatus of FIG. 3.

As shown in FIG. 4, each of the plurality of features 74 may have a profile, a pattern, a color, etc., which can be detected and identified by the sensor 76. The features 74 may be formed at predetermined positions on the surface of a flat plate-like jig 86, by various known techniques, such as printing, stamping, plating, etc. In the embodiment of FIG. 4, two features 74A, 74B having a mutually identical circular profile with inside crisscross pattern and mutually different colors, are formed with a fixed positional interrelationship on the surface of the jig 86. In the coordinate system setting apparatus 70, the jig 86 provided with two features 74A, 74B is fixedly placed for use on the article support surface of the movable part 72 of the conveyor 12. In this connection, on the premise that a fixed positional interrelationship is able to be maintained, a plurality of features 74 respectively formed on mutually separate members may also be used.

The sensor 76 may be configured as a vision sensor able to detect the position of each feature 74 in a three-dimensional manner. In the coordinate system setting apparatus 70, the sensor 76 detects the position of each feature 74A, 74B on the jig 86 placed on the movable part 72 of the conveyor 12, as a position viewed from the robot 16, by a known three-dimensional measurement technique. For this purpose, the sensor 76 may include a camera 88 (FIG. 1) having a detachable configuration, such as a USB camera, and may be configured to attach the camera 88 to a front end (e.g., a hand mounting surface) of the mechanical part of the robot 16 for use, at the time of setting the conveyor coordinate system 66. Alternatively, the camera 88 may be permanently mounted at an arbitral portion of the mechanical part, which does not interfere with the work of the robot 16.

In the robot system 10 shown in FIG. 1, the camera 88 is selectively attached to either the first robot 16A or the second robot 16B, and is connected to a teach pendant 90 having a USB interface by a USB cable 92. The teach pendant 90 is connected through the teach pendant cable 94 to the first or second controller 22A, 22B of the first or second robot 16A, 16B to which the camera 88 is attached. The operator can use the teach pendant 90 so as to control the image capturing operation of the camera 88 attached to the robot 16. The image data captured by the camera 88 is sent through the teach pendant 90 to the first or second controller 22A, 22B. The teach pendant 90 may also have a configuration enabling an operator to instruct the conveyor 12 to perform an object conveying operation and/or instruct the conveyor sensor 20 to obtain a detection value.

As shown in FIG. 2, the first controller 22A is provided with a teach pendant interface 96 to which the teach pendant 90 is connected. The image data of the USB camera 88 sent through the teach pendant 90 is stored in the RAM 38 through the teach pendant interface 96, and analyzed by the CPU 34 so as to be obtained as position data of each feature 74. Thus, the CPU 34, the ROM 36, the RAM 38 and the teach pendant interface 96, of the first controller 22A, constitute the image processing section of the sensor 76 in a case where the camera 88 is attached to the first robot 16A. The second controller 22B is analogously provided with a teach pendant interface 96. The CPU 34, the ROM 36, the RAM 38 and the teach pendant interface 96, of the second controller 22B, constitute the image processing section of the sensor 76 in a case where the camera 88 is attached to the second robot 16B.

The first coordinate acquiring section 78, the second coordinate acquiring section 82 and the coordinate system determining section 84, of the coordinate system setting apparatus 70, may be configured as a function of the CPU 34 of the controller 22 (first controller 22A, second controller 22B). The conveying operation executing section 80 of the coordinate system setting apparatus 70 may be configured as a function of a CPU of a control unit (not shown) for controlling the drive mechanism of the conveyor 12 (or alternatively, a CPU of the teach pendant 90).

The coordinate system setting apparatus 70 having the above configuration can perform a coordinate system setting method according to another aspect of the present invention. The coordinate system setting method according to the other aspect is configured to set a conveyor coordinate system having a predetermined relationship with a base coordinate system of a robot, the conveyor coordinate system used as a coordinate system for defining a position of an object on a conveyor, in a system having a configuration in which a position of the object conveyed by the conveyor is detected and the robot performs a work with respect to the object based on a detected position, the method including the steps of providing a movable part of the conveyor with a plurality of features having a fixed positional relationship with each other, the movable part performing an object conveying operation; providing the robot with a sensor able to detect a position of each of the plurality of features in a non-contact manner; detecting positions of at least two features by the sensor, when the movable part is located at a first operating position, and acquiring detected positions as at least two first coordinates in the base coordinate system; making the movable part perform the object conveying operation from the first, operating position toward a second operating position; detecting a position of at least one feature by the sensor, when the movable part is located at the second operating position, and acquiring a detected position as at least one second coordinate in the base coordinate system; and determining the conveyor coordinate system based on a direction of the object conveying operation, the at least two first coordinates and the at least one second coordinate.

The configuration of one embodiment of a coordinate system setting method performed by the coordinate system setting apparatus 70 will be explained below with reference to FIGS. 5 and 6 as well as FIGS. 1 to 4.

Figure 5:
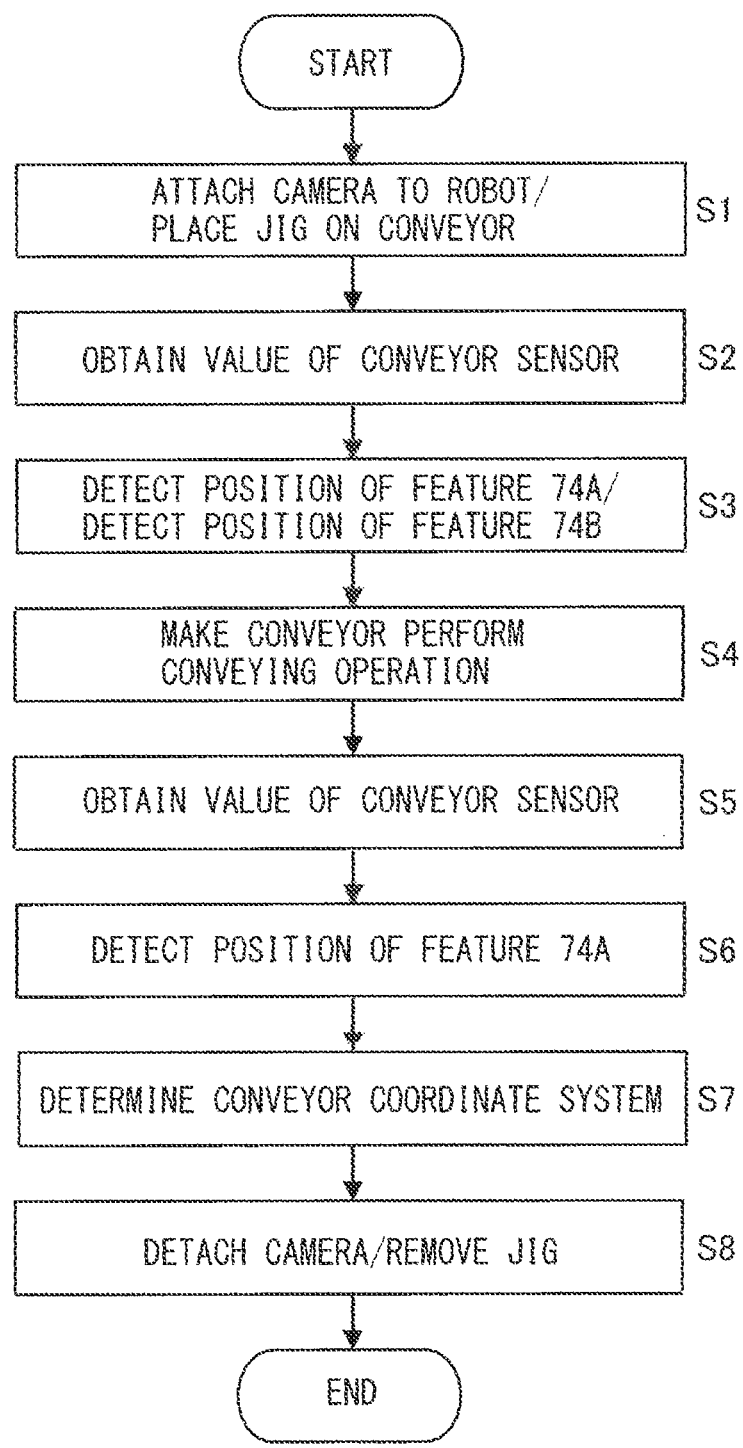
FIG. 5 is a flow chart showing a coordinate system setting procedure in one embodiment of a coordinate system setting method.

In a coordinate system setting flow shown in FIG. 5, first, at step S1, the camera 88 is attached to a predetermined portion of the robot 16 (the first robot 16A or the second robot 16B) and the jig 86 is placed on the movable part 72 of the conveyor 12 in a stopped state. The operating position of the movable part 72 when the jig is placed thereon is defined as a first operating position. In this connection, the jig 86 is located at the farthest possible upstream side in the conveying operation direction α of the conveyor 12, provided that the camera 88 is able to carry out a three-dimensional measurement of two features 74A, 74B. The jig 86 is disposed in such an orientation that the aligned direction of two features 74A, 74B does not coincide with the conveying operation direction α of the conveyor 12. For example, as shown in FIG. 6, the jig 86 is disposed in such an orientation that the aligned direction of two features 74A, 74B is substantially perpendicular to the conveying operation direction α of the conveyor 12.

Next, at step S2, the value (i.e., the first operating position) E1 of the conveyor sensor 20 (FIG. 1) at the time when the jig 86 is placed on the movable part 72 is obtained (this is the act of the first coordinate acquiring section 78). Then, at step S3, the positions of the center points (i.e., the centers of the crisscross patterns) of two features 74A, 74B are detected by the sensor 76, and the detected positions are acquired as two first coordinates P1(x1, y1, z1), P2(x2, y2, z2) in the base coordinate system 68 (FIG. 1) (this is the act of the first coordinate acquiring section 78).

Next, at step S4, the movable part 72 is made to perform the object conveying operation from the first operating position in the direction α, so as to move the jig 86 to the farthest possible downstream position in the conveying operation direction α of the conveyor 12, provided that the camera 88 is able to carry out a three-dimensional measurement of two features 74A, 74B, and the movable part 72 is stopped at that position (this is the act of the conveying operation executing section 80). The operating position of the movable part 72 when it is stopped is defined as a second operating position.

Next, at step S5, the value (i.e., the second operating position) E2 of the conveyor sensor 20 (FIG. 1) after the jig 86 is moved in the conveying operation direction α is obtained (this is the act of the second coordinate acquiring section 82). Then, at step S6, the position of the center point (i.e., the center of the crisscross pattern) of one feature 74A is detected by the sensor 76, and the detected position is acquired as a single second coordinate P3(x3, y3, z3) in the base coordinate system 68 (FIG. 1) (this is the act of the second coordinate acquiring section 82).

Next, at step S7, the conveyor coordinate system 66 is determined based on the direction α of the object conveying operation, the two first coordinates P1, P2, and the single second coordinate P3 as follows (this is the act of the coordinate system determining section 84). First, a scale "S" (i.e., a coefficient for converting a value of an encoder to a value of a coordinate system) of the encoder of the conveyor sensor 20 is determined by Formula 1 with use of the first operating position "E1", the second operating position "E2", the first coordinate P1 and the second coordinate P3.

$$S = \frac{\sqrt{(x3-x1)^2 + (y3-y1)^2 + (z3-z1)^2}}{E2 - E1} \quad \text{Formula 1}$$

Regarding the conveyor coordinate system 66, X-axis (or a fundamental vector X) is first determined by Formula 2 with use of the first coordinate P1 and the second coordinate 23. The positive direction of the X-axis determined in this way coincides with the conveying operation direction α of the movable part 72 (FIG. 6).

$$\vec{X} = \frac{(x3-x1, y3-y1, z3-z1)}{\sqrt{(x3-x1)^2 + (y3-y1)^2 + (z3-z1)^2}} \quad \text{Formula 2}$$

As to Y-axis (or a fundamental vector Y) and Z-axis (or a fundamental vector Z), a vector Y' is first determined by Formula 3 with use of the first coordinates P1 and P2.

$$\vec{Y}' = \frac{(x2-x1, y2-y1, z2-z1)}{\sqrt{(x2-x1)^2 + (y2-y1)^2 + (z2-z1)^2}} \quad \text{Formula 3}$$

Then, Z-axis (or a fundamental vector Z) is determined by Formula 4, and Y-axis (or a fundamental vector Y) is determined by Formula 5, both using the cross product.

$$\vec{Z} = \frac{\vec{X} \times \vec{Y}'}{|\vec{X} \times \vec{Y}'|} \quad \text{Formula 4}$$

$$\vec{Y} = \frac{\vec{Z} \times \vec{X}}{|\vec{Z} \times \vec{X}|} \quad \text{Formula 5}$$

Figure 6:
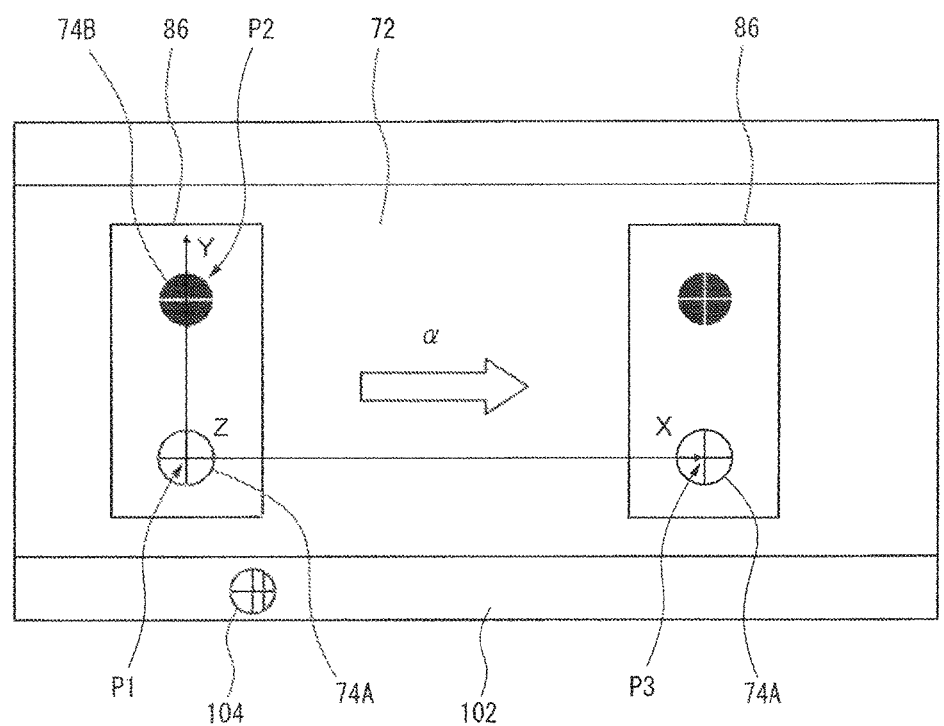
FIG. 6 is a plan view showing a position detection step in the coordinate system setting procedure of FIG. 5.

The positive direction of the Z-axis determined in this way is defined as a direction projecting outward from the drawing surface of FIG. 6, while the positive direction of the Y-axis is defined as a direction from bottom to top in the drawing surface of FIG. 6. After the respective fundamental vectors of the X-, Y- and Z-axes are determined in this way, the conveyor coordinate system 66 is determined by defining, e.g., the point P1(x1, y1, z1) as the origin of the conveyor coordinate system 66.

After determining the conveyor coordinate system 66, at step S8, the camera 88 is detached from the robot 16 (the first robot 16A or the second robot 16B) and the jig 86 is removed from the movable part 72 of the conveyor 12 in the stopped state. In this manner, the setting flow of the conveyor coordinate system 66 is completed.

When the above-described coordinate system setting flow is performed for the first robot 16A, it is possible to set the conveyor coordinate system 66 in which the first controller 22A makes the first robot 16A pick up the article R from the conveyor 12, while when being performed for the second robot 16B, it is possible to set the conveyor coordinate system 66 in which the second controller 22B makes the second robot 16B pick up the article R from the conveyor 12.

Figure 7:
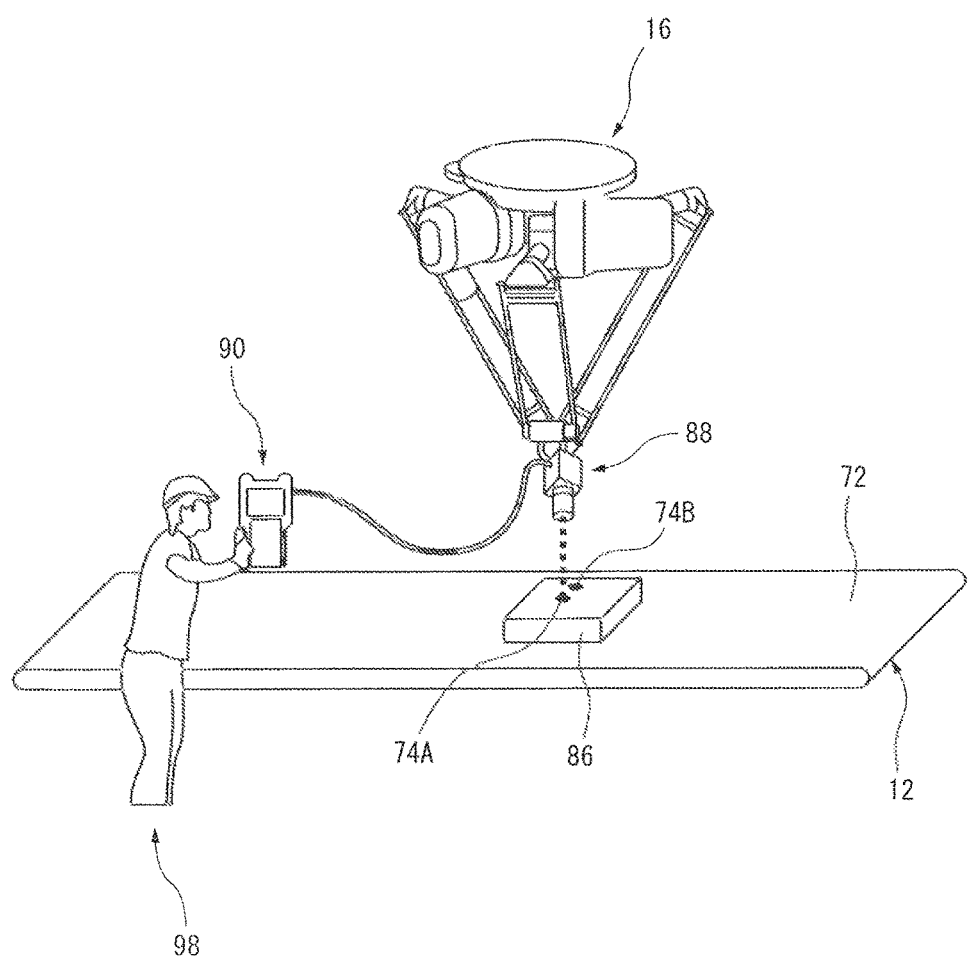
FIG. 7 is a view schematically showing the appearance of an actual place where the coordinate system setting procedure of FIG. 5 is performed.

FIG. 7 schematically shows the appearance of an actual place where the above-described coordinate system setting method is performed. The camera 88 is attached to the hand attachment surface of the mechanical part of the robot 16, and the jig 86 is placed on the movable part 72 of the conveyor 12. An operator 98 uses the teach pendant 90 so as to make the camera 88 capture the images of the features 74A, 74B of the jig 86.

According to the coordinate system setting apparatus 70 having the above configuration and the coordinate system setting method analogous thereto, it is possible to set the conveyor coordinate system 66 by simply making the conveyor 12 provided with two features 74A, 74B perform the object conveying operation from the first operating position to the second operating position, and by simply making the sensor 76 provided on the robot 16 to detect the positions of the two features 74A, 74B in the first operating position and the position of the single feature 74A in the second operating position. Therefore, it is possible to easily set the conveyor coordinate system 66 in a reproducible manner without requiring operator's skill.

In the above configuration, the respective numbers of the robots 16, the controllers 22 and the discharge conveyors 18, included in the robot system 10, are not limited to two, but may be one, or three or more. As the number of the robots 16 increases, it is possible to increase the number of the articles R transferred from the conveyor 12 to the discharge conveyor 18 or the transferring speed thereof. Also, the number of the features 74 provided in the coordinate system setting apparatus 70 is not limited to two, but may be three or more. As the number of the features 74 increases, it is possible to improve the setting precision of the conveyor coordinate system 66.

Figure 8:
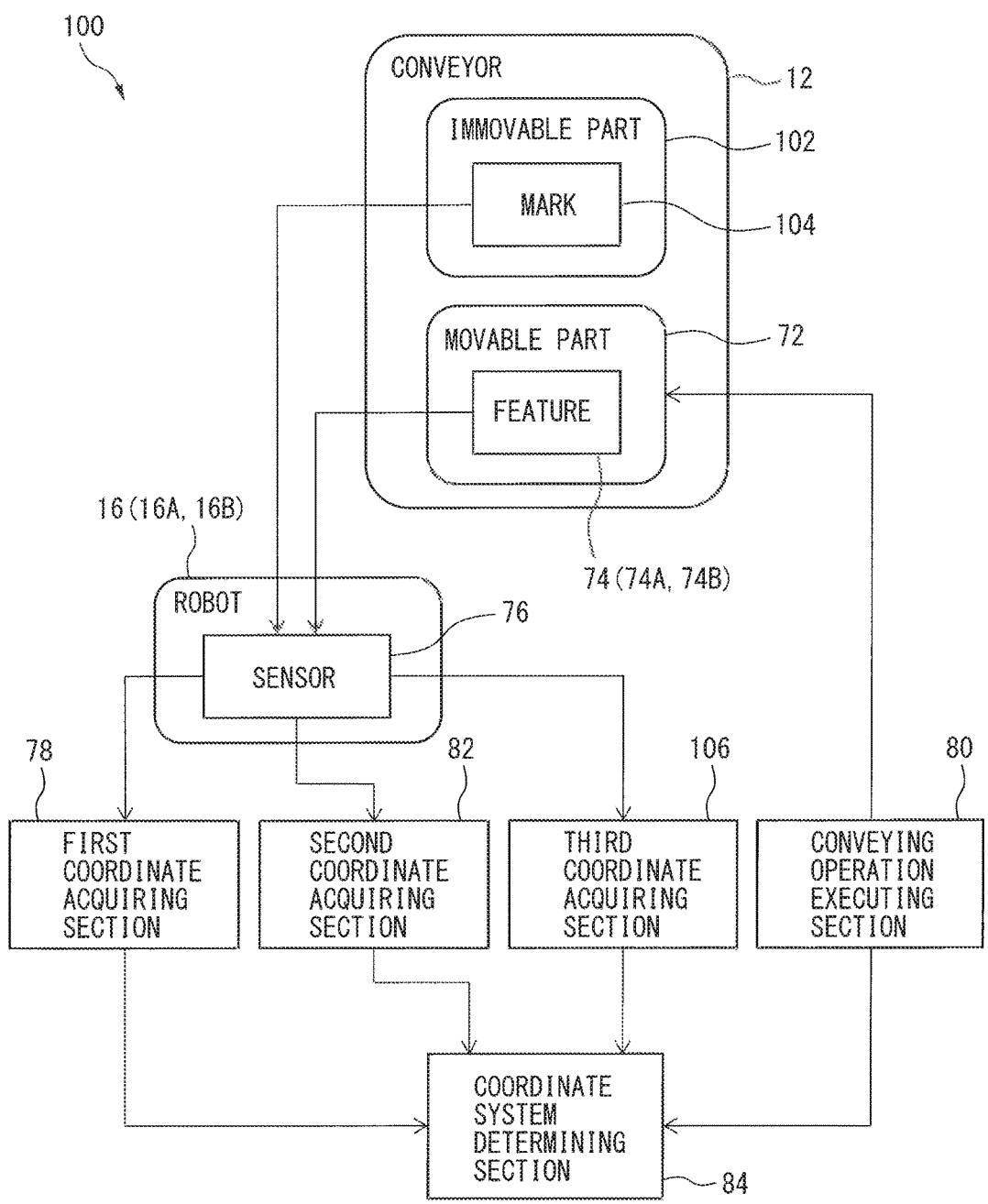
FIG. 8 is a functional block diagram showing the configuration of another embodiment of a coordinate system setting apparatus.

FIG. 8 shows a coordinate system setting apparatus 100 according to another embodiment, which may be provided in the robot system 10. The coordinate system setting apparatus 100 has a configuration analogous to that of the aforementioned coordinate system setting apparatus 70, except for the provision of a mark 104 used for determining the origin of the conveyor coordinate system 66. Accordingly, components corresponding to the components of the coordinate system setting apparatus 70 will be denoted by the same reference numerals and the detailed explanations thereof will not be repeated.

Analogous to the coordinate system setting apparatus 70, the coordinate system setting apparatus 100 includes a plurality of features 74 provided on a movable part 72 of a conveyor 12, a sensor 76 provided on a robot 16, a first coordinate acquiring section 78 configured to acquire positions of at least two features 74 when the movable part 72 is located at a first operating position as at least two first coordinates in a base coordinate system 68 (FIG. 1), a conveying operation executing section 80 configured to make the movable part 72 perform an object conveying operation from the first operating position toward a second operating position, a second coordinate acquiring section 82 configured to acquire a position of at least one feature 74 when the movable part 72 is located at the second operating position as at least one second coordinate in the base coordinate system 68, and a coordinate system determining section 84 configured to determine the conveyor coordinate system 66 (FIG. 1) based on a direction of the object conveying operation, the at least two first coordinates and the at least one second coordinate.

The coordinate system setting apparatus 100 further includes a mark 104 set at a predetermined portion of an immovable part (e.g., a frame structure for supporting a conveyance member) 102 of the conveyor 12, the immovable part not performing the object conveying operation, a position of the mark being detectable by the sensor 76 in a non-contact manner, and a third coordinate acquiring section 106 configured to make the sensor 76 detect a position of the mark 104 and acquire a detected position as a third coordinate in the base coordinate system 68. The coordinate system determining section 84 determines the conveyor coordinate system 66 by using the third coordinate acquired by the third coordinate acquiring section 106 as the origin of the conveyor coordinate system 66. Note that, the third coordinate acquiring section 106 of the coordinate system setting apparatus 100 may be configured as a function of the CPU 34 of the controller 22 (FIG. 1), analogously to the first coordinate acquiring section 78, the second coordinate acquiring section 82 and the coordinate system determining section 84.

Figure 9A:
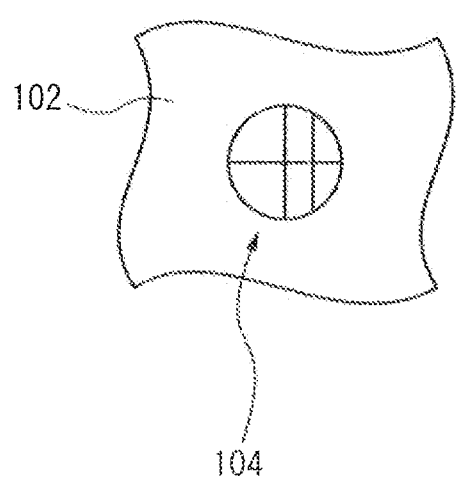
FIG. 9A is a plan view showing one example of a mark of the coordinate system setting apparatus of FIG. 8.
Figure 9B:
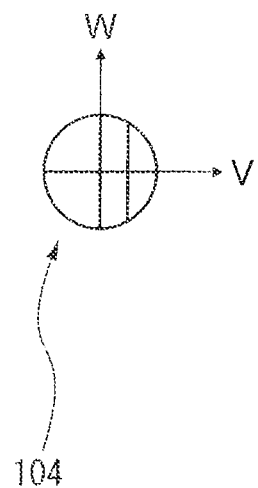
FIG. 9B is a view showing the mark of FIG. 9A together with a coordinate system.

As shown in FIG. 9A, the mark 104 may have a profile, a pattern, a color, etc., which can be detected and identified by the sensor 76. As shown in FIG. 6, the mark 104 may be formed at a predetermined position on the surface of the immovable part 102, by various known techniques, such as printing, stamping, plating, etc. Alternatively, a characteristic element (profile, pattern, color, etc.) provided essentially on the surface of the immovable part 102 may be defined as the mark 104. In the embodiment of FIG. 9A, a single mark 104 having a circular profile with inside crisscross pattern and a single straight-line pattern for providing directionality for the crisscross pattern is formed on the surface of the immovable part 102. As shown in FIG. 9B, it is possible to virtually fit a Cartesian coordinate system having a V-axis and a W-axis into the mark 104 having two-dimensional directionality.

The coordinate system setting apparatus 100 having the above configuration can perform a coordinate system setting method according to another aspect of the present invention, analogously to the coordinate system setting apparatus 70. The configuration of another embodiment of a coordinate system setting method performed by the coordinate system setting apparatus 100 will be explained below with reference to FIG. 10 as well as FIGS. 8 to 9B.

Figure 10:
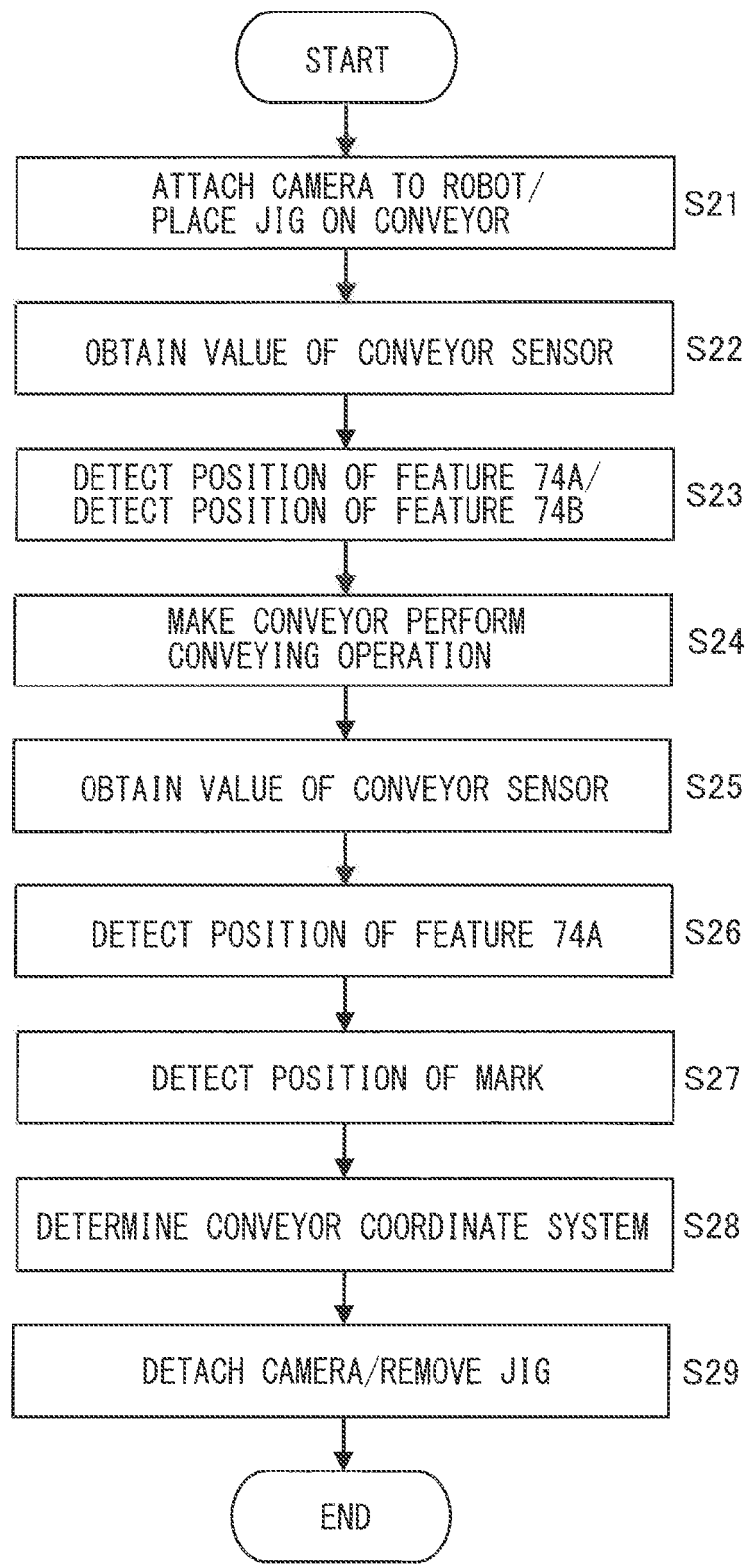
FIG. 10 is a flow chart showing a coordinate system setting procedure in another embodiment of a coordinate system setting method.

In a coordinate system setting flow shown in FIG. 10, during steps S21 to S26, which are the same as steps S1 to S6 of FIG. 5, two first coordinates P1(x1, y1, z1), P2(x2, y2, z2) of two features 74A, 74B and one second coordinate P3(x3, y3, z3) of one feature 74A are acquired. Next, at step S27, the position of the mark 104 is detected by the sensor 76, and the detected position is acquired as a third coordinate P0(x0, y0, z0) in the base coordinate system 68 (this is the act of the third coordinate acquiring section 106).

Next, at step S28, X-axis, Y-axis and Z-axis of the conveyor coordinate system 66 are determined by the aforementioned Formulas 1 to 5 based on the direction α of the object conveying operation, the two first coordinates P1, P2, and the single second coordinate P3, and the conveyor coordinate system 66 is determined by defining the point P0(x0, y0, z0) determined at step S27 as the origin of the conveyor coordinate system 66 (this is the act of the coordinate system determining section 84). The last step S29 is the same as step S8 of FIG. 5. In this manner, the setting flow of the conveyor coordinate system 66 is completed.

According to the coordinate system setting apparatus 100 having the above configuration and the coordinate system setting method analogous thereto, it is possible to exhibit the same effects as those of the aforementioned coordinate system setting apparatus 70. In addition, setting the mark 104 on the immovable part 102 of the conveyor 12 and detecting the position of the mark 104 by the sensor 76 make it possible to set the conveyor coordinate system 66 with the origin defined by the third coordinate P0 of the mark 104. Once the mark 104 is set on the immovable part 102 of the conveyor 12, there is no longer need to verify the position of the origin when setting the conveyor coordinate system 66, so that it is possible to set the conveyor coordinate system 66 in a reproducible manner. In this connection, only one mark 104 may be needed, so that it is possible to appropriately move the camera 88 and capture the image of the feature 74 or the mark 104, even if the working area of a robot 12 is relatively narrow.

In the coordinate system setting flow shown in FIG. 10, the position of the mark 104 is detected at step S27, but alternatively, it is also possible to additionally detect an orientation of the mark 104 by the sensor 76 at step S27. The detection procedure of the position and orientation of the mark 104 at step S27 will be explained with reference to FIGS. 11 and 12.

Figure 11:
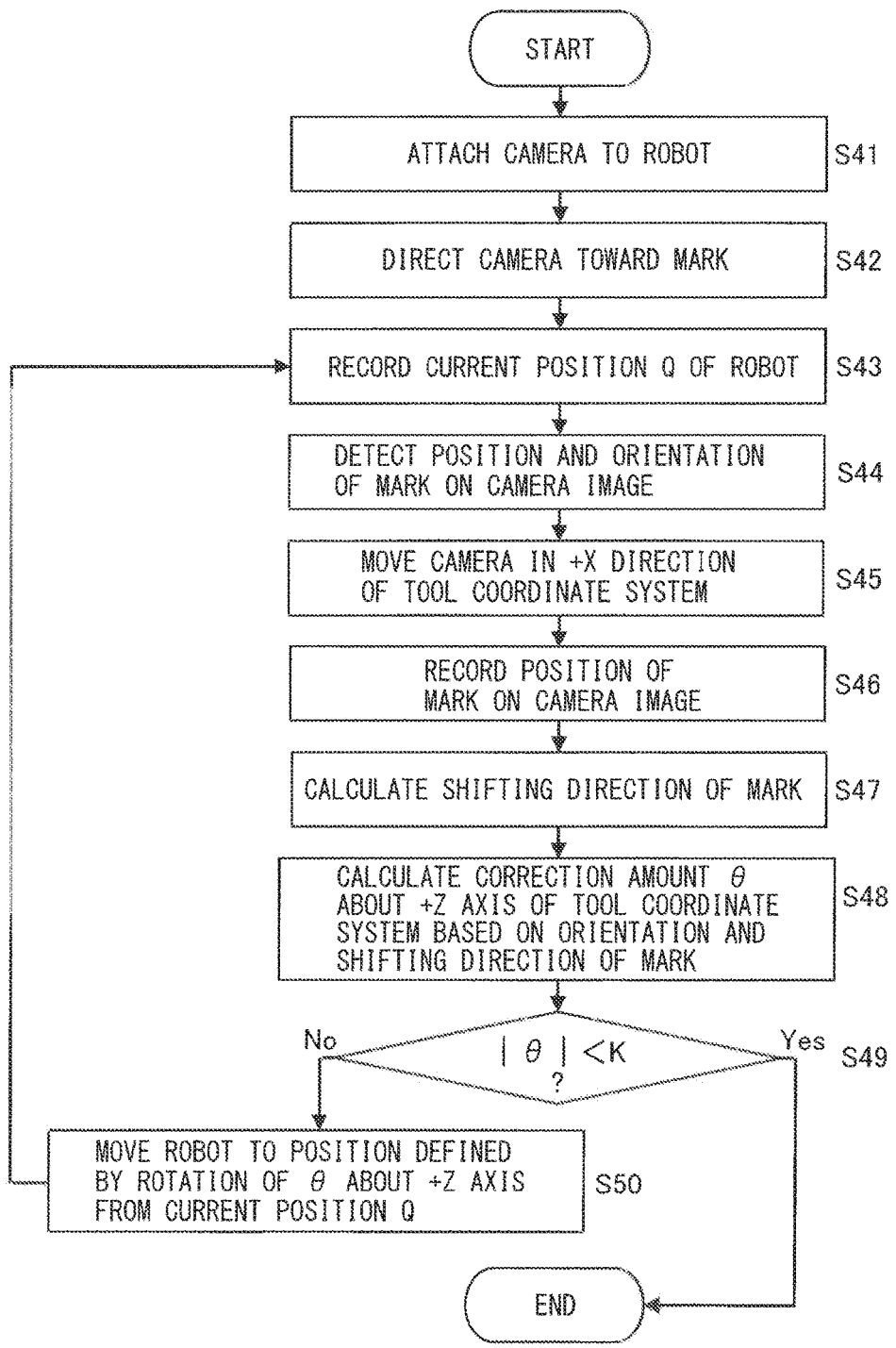
FIG. 11 is a flow chart showing a mark detection procedure of a mark detection step in the coordinate system setting procedure of FIG. 10.

In the mark detection flow shown in FIG. 11, first, at step S41, the camera 88 (FIG. 1) is attached to a predetermined portion of the robot 16 (the first robot 16A or the second robot 16B) (or alternatively, the state where the camera 88 is attached to the robot 16 at step S21 of FIG. 10 is maintained). Next, at step S42, the robot 16 is appropriately operated, and thereby the camera 88 is placed in front of and directed toward the mark 104 at a position spaced from the mark 104 by a designated distance. In this connection, a tool coordinate system is defined, in which a Z-axis is defined by the optical axis of the camera 88 and the origin is defined by the position of the center point of the mark 104 (i.e., the center of the crisscross pattern). Then, at step S43, the position and the orientation, of the robot 16, in the base coordinate system 68 (FIG. 1) having a known relationship with the tool coordinate system are recorded as a current position Q.

Next, at step S44, in the two-dimensional image of the camera 88, the position of the center point of the mark 104 and the positive direction of the V-axis (FIG. 9B) (i.e., the orientation of the mark 104) are detected and recorded. The detection of the position of the mark 104 may be performed by a Known pattern matching technique, such as a normalized correlation method configured to search for a pattern coinciding with a previously registered model pattern from an image captured by the camera 88. On the other hand, the detection of the positive direction of the V-axis may be performed in such a manner that, e.g., in the normalized correlation method, a model pattern is taught in a state where the direction of a horizontal axis in the two-dimensional image of the camera 88 coincides with the direction of the V-axis or the mark 104, and thereby the V-axis direction of the mark 104 is associated with a rotational angle which is one of detection parameters of the pattern matching.

Figure 12:
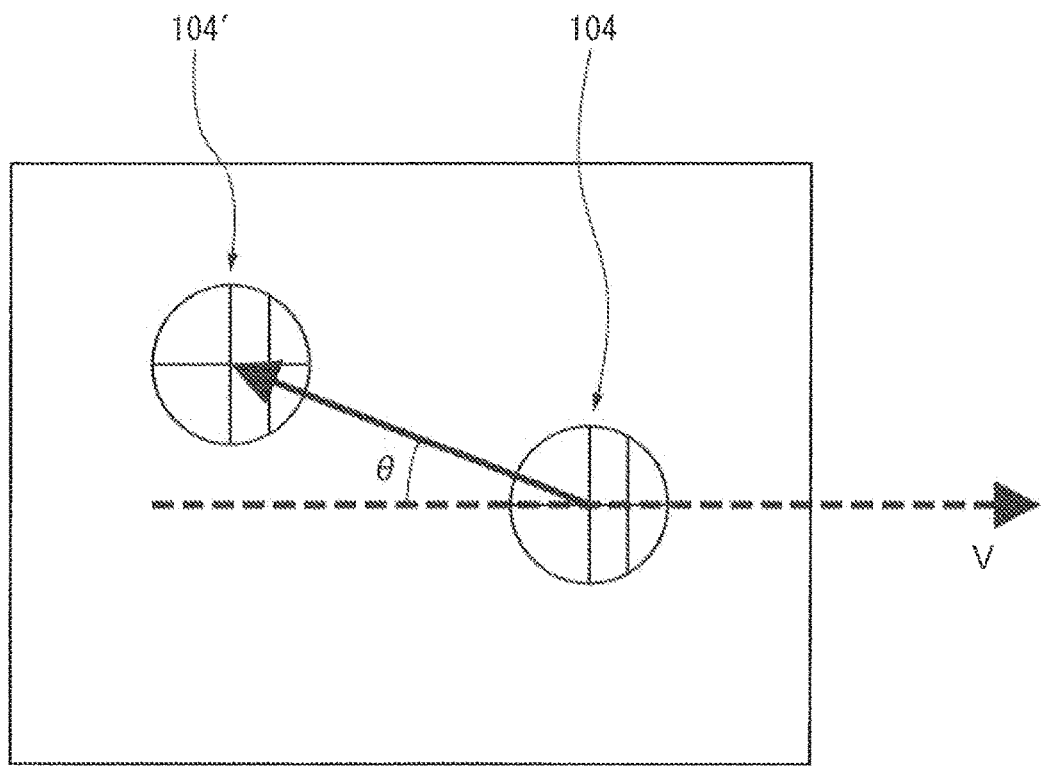
FIG. 12 is a view schematically showing a correction-amount calculation step in the mark detection procedure of FIG. 11.

Next, at step S45, the robot 16 is operated so as to move the camera 88 in the +X (plus X)-axis direction in the tool coordinate system having a known relationship with the base coordinate system 68. At this time, if the +X (plus X)-axis direction of the tool coordinate system does not coincide with the +V (plus V)-axis direction of the mark 104 on the camera image, the mark 104 is shifted on the camera image in a direction non-parallel to the +V (plus V)-axis as shown in FIG. 12 (the shifted mark 104' is illustrated). Next, at step S46, the position of the center point of the shifted mark 104' on the camera image is detected and recorded in a manner analogous to step S44, and at step S47, the shifting direction of the mark 104 on the camera image is calculated based on the positions of the marks 104, 104' recorded at steps S44 and S46.

Next, at step S48, a correction amount θ (FIG. 12) about the +Z (plus Z)-axis of the tool coordinate system is calculated as an amount representing a deviation between the +X (plus X)-axis direction of the tool coordinate system and the +V (plus V)-axis direction of the mark 104 on the camera image, based on the orientation of the mark 104 recorded at step S44 and the shifting direction of the mark 104 calculated at step S47. Then, at step S49, the absolute value of the correction amount θ is compared with a predetermined threshold value K and, if smaller than K, the mark position detection flow is finished. If the absolute value of the correction amount θ is equal to or more than the threshold value K, the robot 16 is moved, at step S50, from the current position Q by the correction amount θ, so as to rotate the camera 88 by the angle θ about the +Z (plus Z)-axis of the tool coordinate system.

Thereafter, returning to step S43, steps S44 to S49 are again performed and it is judged whether the absolute value of the correction amount θ becomes smaller than the threshold value K. Until the result of judgment of step S49 becomes YES, steps S43 to S50 are repeated. In this connection, although it is ideal that the correction amount θ converges to zero, the threshold value K determined by an experimental rule, etc., is used since it is difficult to completely eliminate an error caused due to the operation of the robot 16 etc.

According to the above-described mark position detection flow, in addition to determining the coordinate P0(x0, y0, z0) of the center point of the mark 104 in the base coordinate system 68 of the robot 16, the relationship between the orientation of the mark 104 and the orientation of the base coordinate system 68 becomes known, based on the fact that the V-axis direction of the mark 104 substantially coincides with the K-axis direction of the tool coordinate system at the current position Q of the robot 16. When the above relationship is retained, it is possible to recognize, as needed, a direction or orientation in which the mark 104, or the conveyor 12, is arranged with respect to the robot 16 based on the image of the camera 88.

As stated previously, in the robot system 10 in which the robot 16 performs a work with respect to the conveyor 12, as a result of a supplementary work performed for the robot system 10 which has already been established, such as maintenance on the conveyor 12 and/or the robot 16, relocation of the entire system to another place, etc., sometimes a positional relationship between the conveyor 12 and the robot 16 changes between before and after performing the supplementary work. The coordinate system setting apparatus 100 may be configured so that, in the case where a supplementary work, such as maintenance or system relocation, is performed for the robot system 10 which has already been established, the conveyor coordinate system 66 is reset after performing the supplementary work. The configuration of still another embodiment of the coordinate system setting method performed by the coordinate system setting apparatus 100 in order to reset the conveyor coordinate system 66 after performing the supplementary work, will be explained below with reference to FIG. 13 as well as FIG. 8.

Figure 13:
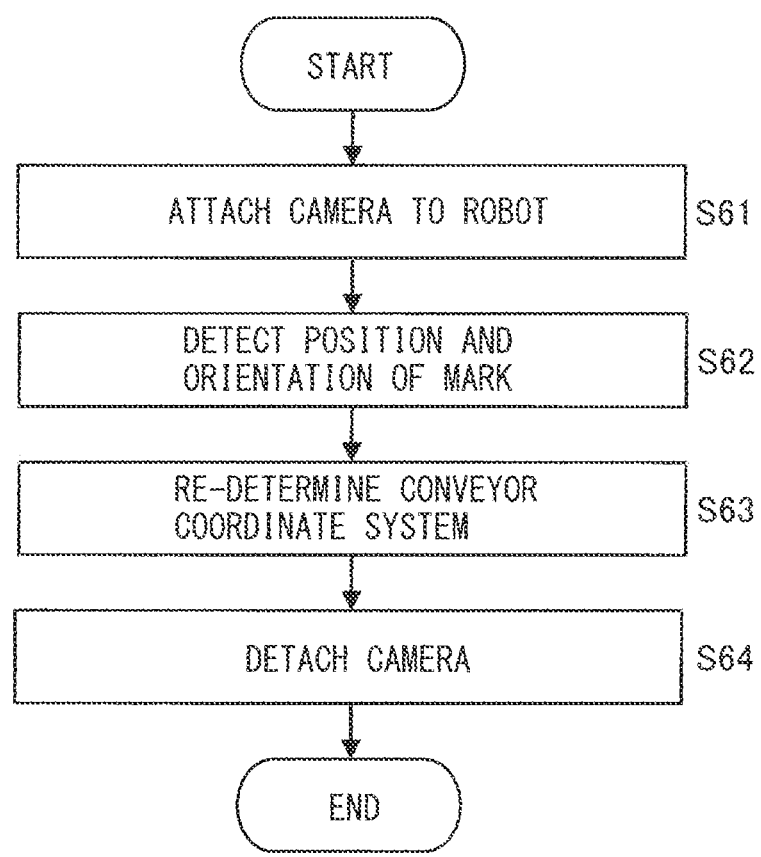
FIG. 13 is a flow chart showing a coordinate system setting procedure in still another embodiment of a coordinate system setting method.

A coordinate system setting flow shown in FIG. 13 is configured to reset the conveyor coordinate system 66 so as to compensate a change in the positional relationship between the conveyor 12 and the robot 16 due to the supplementary work (e.g., the system relocation), after completing the setting of the conveyor coordinate system 66 (i.e., the determination of the conveyor coordinate system 66 at step S28) by the coordinate system setting flow shown in FIG. 10. First, at step S61, the camera 88 (FIG. 1) is attached to a predetermined portion of the robot 16 (the first robot 16A or the second robot 16B). In this coordinate system setting flow, the usage of the jig 86 and the detection of the feature 74, in the coordinate system setting flow of FIG. 10, are not performed.

Next, at step S62, the position and the orientation of the mark 104 in the two-dimensional image of the camera 88 are detected again or re-detected in a manner analogous to step S44 of FIG. 11. Then, at step S63, the conveyor coordinate system 66 is determined again or re-determined, based on an amount of change in the position and the orientation of the mark 104, in a case where the position and the orientation of the mark 104, re-detected at step S62, have changed from the position and the orientation of the mark 104, detected at the time of setting the conveyor coordinate system 66 before performing the supplementary work (i.e., detected at step S27 of FIG. 10). Finally, at step S64, the camera 88 is detached from the robot 16, whereby the resetting flow of the conveyor coordinate system 66 is completed.

At step S63, the conveyor coordinate system 66 is re-determined by Formula 6, in which "M1" denotes a matrix representing the position and orientation of the mark 104 detected at step S27, "C1" denotes a matrix representing the conveyor coordinate system 66 determined at step S28, "M2" denotes a matrix representing the position and orientation of the mark 104 detected at step S62, and "C2" denotes a matrix representing the conveyor coordinate system 66 determined at step S63.

$$C2=(M2 \cdot M1^{-1}) \cdot C1 \qquad \text{Formula 6}$$

According to the coordinate system setting apparatus 100 having the above configuration and the coordinate system setting method analogous thereto, in addition to the aforementioned effects, it is possible to reset the conveyor coordinate system 66 by simply detecting the position and orientation of the mark 104, so that, in the case where a supplementary work, such as maintenance or system relocation, is performed for the robot system 10 which has already been established, it is possible to easily execute the resetting of the conveyor coordinate system 66 after performing the supplementary work.

In a configuration wherein the robot system 10 is provided with the object detecting section 14 in particular, the image capturing section 28) in a fixed positional relationship with respect to the robot 16, the object detecting section configured to detect a position of an object (or an article R) conveyed by the conveyor 12, as a result of a supplementary work, such as maintenance or system relocation, performed for the robot system 10 which has already been established, sometimes a positional relationship between the conveyor 12 and the image capturing section 28 changes between before and after performing the supplementary work. If the positional relationship between the conveyor 12 and the image capturing section 28 changes, it is necessary, after the positional relationship has changed, to re-determine a coordinate system of the image capturing section 28 (in the present application, referred to as a "camera coordinate system") which has been determined by carrying out a calibration of the image capturing section 28 in the conveyor coordinate system 66 before the change occurs. The coordinate system setting apparatus 100 may be configured so that, in the case where a supplementary work, such as maintenance or system relocation, is performed for the robot system 10 which has already been established, the camera coordinate system of the image capturing section 28 is reset after performing the supplementary work. The configuration of still another embodiment of the coordinate system setting method performed by the coordinate system setting apparatus 100, in order to reset the camera coordinate system after performing the supplementary work, will be explained below with reference to FIG. 14 as well as FIG. 8.

Figure 14:
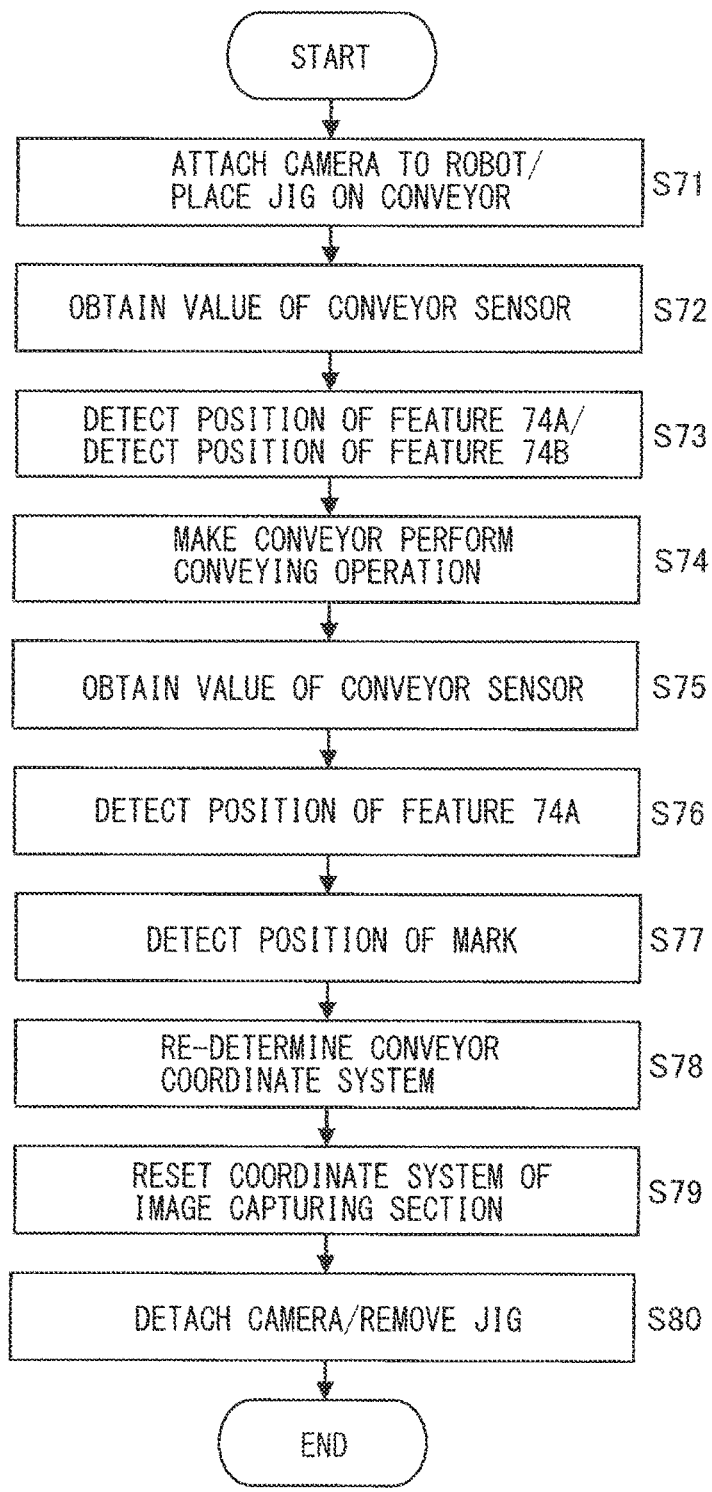
FIG. 14 is a flow chart showing a coordinate system setting procedure in still another embodiment of a coordinate system setting method.

A coordinate system setting flow shown in FIG. 14 is configured to reset the camera coordinate system of the image capturing section 28 so as to compensate a change in the positional relationship between the conveyor 12 and the object detecting section 14 (in particular, the image capturing section 28) due to the supplementary work (e.g., the system relocation), after completing the setting of the conveyor coordinate system 66 (i.e., the determination of the conveyor coordinate system 66 at step S28) by the coordinate system setting flow shown in FIG. 10, and as an additional process when resetting the conveyor coordinate system 66 by the coordinate system setting flow shown in FIG. 13. Note that, in this embodiment, the resetting of the camera coordinate system of the image capturing section 28 is synonymous with the change in the positional relationship of the object detecting section 14 (in particular, the image capturing section 28) with respect to the conveyor 12.

In the coordinate system setting flow shown in FIG. 14, during steps S71 to S78, which are the same as steps S21 to S28 of FIG. 10, the two first coordinates P1(x1, y1, z1), P2(x2, y2, z2) of the two features 74A, 74B, the one second coordinate P3(x3, y3, z3) of the one feature 74A and the third coordinate P0(x0, y0, z0) of the mark 104 are acquired again or re-acquired, and the conveyor coordinate system 66 is re-determined. Next, at step S79, in a case where the conveyor coordinate system 66 re-determined at step S78 has changed from the previously determined conveyor coordinate system 66 (i.e., determined at step S28 of FIG. 10), the camera coordinate system of the image capturing section 28 is reset (i.e., the positional relationship of the object detecting section 14 (in particular, the image capturing section 28) with respect to the conveyor 12 is changed) based on the amount of change in the conveyor coordinate system 66. The last step S80 is the same as step S29 of FIG. 10. In this manner, the resetting flow of the conveyor coordinate system 66 is completed.

At step S79, the camera coordinate system is re-determined by Formula 7, in which "L1" denotes a matrix representing the camera coordinate system of the image capturing section 28, determined by a known calibration method before performing the supplementary work, "C1" denotes a matrix representing the conveyor coordinate system 66 determined at step S28, "L2" denotes a matrix representing the camera coordinate system of the image capturing section 28, determined by a known calibration method after performing the supplementary work, and "C2"

denotes a matrix representing the conveyor coordinate system 66 determined at step S63.

$$L2=(C2^{-1} \cdot C1) \cdot L1 \qquad \text{Formula 7}$$

Figure 15:
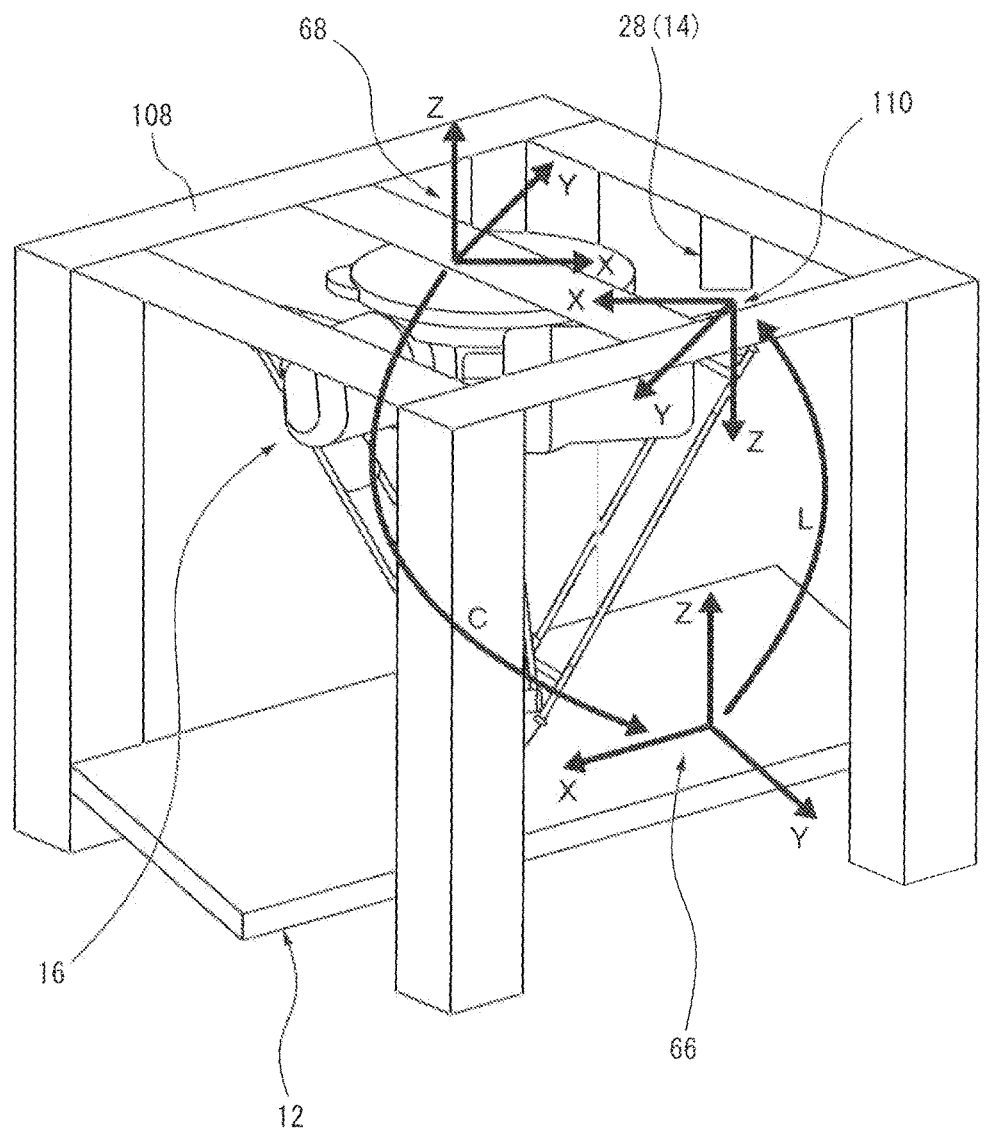
FIG. 15 is a view schematically showing the appearance of an actual place where the coordinate system setting procedure of FIG. 14 is performed.

FIG. 15 schematically shows the appearance of an actual place where the above-described coordinate system setting method is performed. The image capturing section 28 of the object detecting section 14 is attached to a framework 108 together with the mechanical part of the robot 16. Although the relationship between the position and orientation of the base coordinate system 68 of the robot 16 and those of the camera coordinate system 110 of the image capturing section 28 is fixed, the relationship between the position and orientation of the camera coordinate system 110 and those of the conveyor coordinate system 66 may be changed between before and after performing a supplementary work such as maintenance or system relocation.

According to the coordinate system setting apparatus 100 having the above configuration and the coordinate system setting method analogous thereto, in addition to the aforementioned effects, it is possible to reset the camera coordinate system of the image capturing section 28 by simply detecting the position of the feature 74 and the position of the mark 104, so that, in the case where a supplementary work, such as maintenance or system relocation, is performed for the robot system 10 which has already been established, it is possible to easily execute the resetting of the camera coordinate system after performing the supplementary work.

Figure 16:
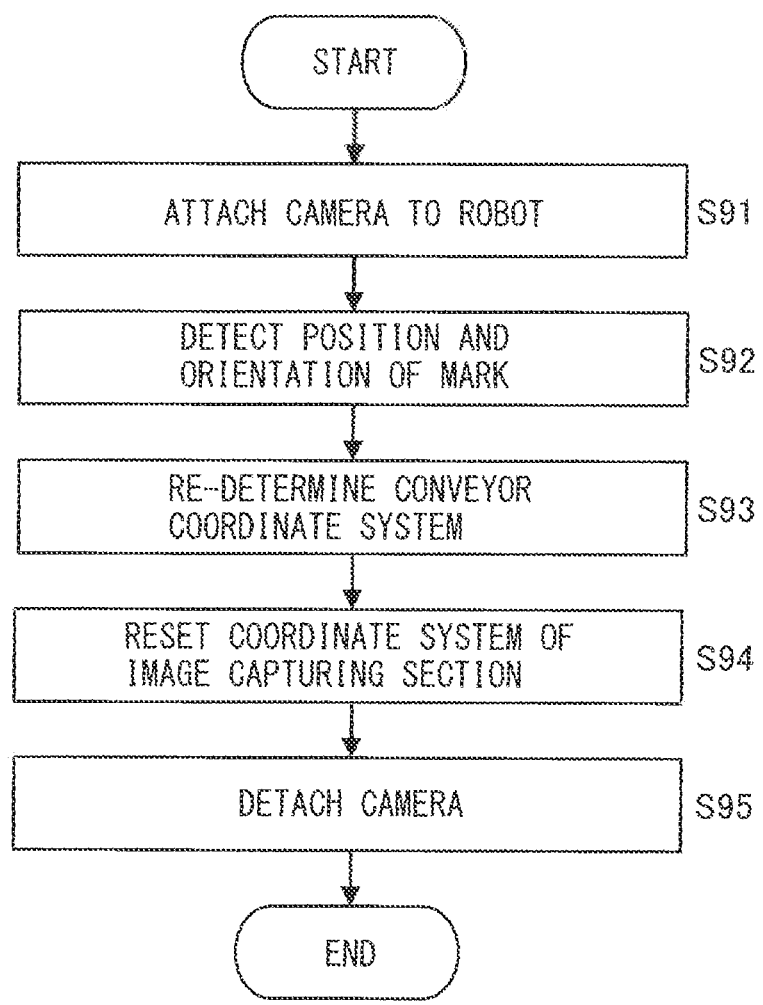
FIG. 16 is a flow chart showing a coordinate system setting procedure in still another embodiment of a coordinate system setting method.

The coordinate system setting apparatus 100 can also perform the resetting of the camera coordinate system of the image capturing section 28 in the coordinate system setting flow shown in FIG. 13. FIG. 16 shows the configuration of still another embodiment of a coordinate system setting method configured to perform such an alternative flow. In a coordinate system setting flow shown in FIG. 16, during steps S91 to S93, which are the same as steps S61 to S63 of FIG. 13, the position and orientation of the mark 104 are detected, and the conveyor coordinate system 66 is re-determined based on the amount of change in the position and orientation of the mark 104. Next, at step S94, the camera coordinate system of the image capturing section 28 is reset (i.e., the positional relationship of the object detecting section 14 (in particular, the image capturing section 28) with respect to the conveyor 12 is changed) based on the amount of change in the position and orientation of the mark 104. The last step S95 is the same as step S64 of FIG. 13. In this manner, the resetting flow of the conveyor coordinate system 66 is completed.

In a configuration including a plurality of robots 16, such as a robot system 10, it is possible to simplify a procedure for setting a conveyor coordinate system 66 in connection with a robot 16 (in FIG. 1, the second robot 16B) disposed at a downstream side in the conveying operation direction α of the conveyor 12. The configuration of still another embodiment of the coordinate system setting method performed by the coordinate system setting apparatus 100, in order to set the conveyor coordinate system 66 in connection with the robot 16 disposed at the downstream side in the conveying operation direction α of the conveyor 12, will be explained below with reference to FIGS. 17 and 18 as well as FIG. 8.

Figure 17:
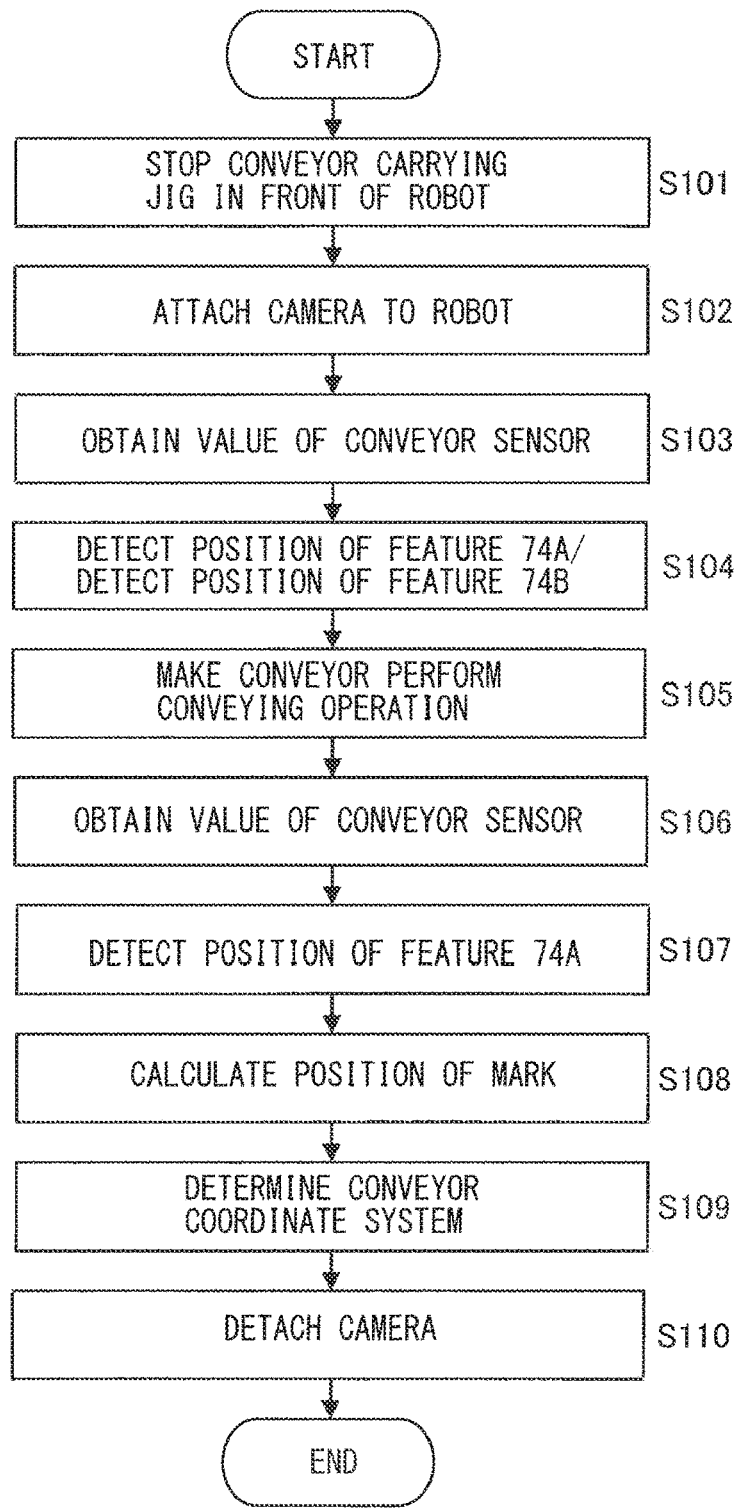
FIG. 17 is a flow chart showing a coordinate system setting procedure in still another embodiment of a coordinate system setting method.

A coordinate system setting flow shown in FIG. 17 has a configuration in which, on the premise that conveyor coordinate system 66 in connection with a robot 16 (in FIG. 1, the first robot 16A) disposed at the farthest upstream side in the conveying operation direction α of the conveyor 12 is set by the coordinate system setting flow shown in FIG. 10, it is possible to set a conveyor coordinate system 66 in connection with a robot 16 (in FIG. 1, the second robot 16B) disposed at the downstream side in the conveying operation direction α of the conveyor 12 without detecting once again the position of the mark 104, by using the position of the mark 104 detected at step S27 of FIG. 10.

More specifically, the coordinate system setting method according to this embodiment has a configuration in which the robot system 10 includes a plurality of robots 16A, 16B, each robot configured to perform a work of picking up an arbitrary object in connection with a plurality of objects conveyed by the conveyor 12, the method comprising, as the step of determining the conveyor coordinate system 66, determining a first conveyor coordinate system 66 usable by a farthest upstream-side robot 16 (i.e., a first robot 16A); and determining a second conveyor coordinate system 66 usable by a downstream-side robot 16 (i.e., a second robot 16B); the method further comprising setting the mark 104 at a predetermined portion of the immovable part 102 of the conveyor (12); wherein, when the first conveyor coordinate system 66 is determined, a position of the mark 104 is detected by the sensor 76, the detected position is acquired as a third coordinate 30 in the base coordinate system 68, and the third coordinate P0 is used as the origin of the first conveyor coordinate system 66, and wherein when the second conveyor coordinate system 66 is determined, the third coordinate P0 is transformed to a coordinate of the origin of the second conveyor coordinate system 66, with use of the first operating position of the movable part 72 at a time when the first conveyor coordinate system 66 is determined and the first operating position of the movable part 72 at a time when the second conveyor coordinate system 66 is determined.

First, at step S101, the movable part 72 is moved in the conveying operation direction α without removing the jig 86 from the conveyor 12 at step S29 of FIG. 10 after the conveyor coordinate system 66 is determined in connection with the farthest upstream-side robot 16 (or the first robot 16A), and the conveyor 12 is stopped at a position where the jig 86 comes inside the working area of the downstream-side robot 16 (or the second robot. 16B). Next, at step S102, the camera 88 detached from the farthest upstream-side robot 16 (the first robot 16A) at step S29 of FIG. 10 is attached to a predetermined portion of the downstream-side robot 16 (the second robot 16B).

During steps S103 to S107 in the coordinate system setting flow of FIG. 17, which correspond to steps S22 to S26 of FIG. 10, two first coordinates P1(x1, y1, z1), P2(x2, y2, z2) of two features 74A, 74B and one second coordinate P3(x3, y3, z3) of one feature 74A are acquired in connection with the downstream-side robot 16 (the second robot 16B). Next, at step S108, the position of the mark 104 is determined in connection with the downstream-side robot 16 the second robot 16B) by the following calculation instead of the detection performed by the sensor 76.

In the calculation, the value of the conveyor sensor 20 (FIG. 1) obtained at step S22 of FIG. 10 (i.e., the first operating position) in connection with the farthest upstream-side robot 16 (the first robot 16A) is denoted by "e1", and the value of the conveyor sensor 20 (FIG. 1) obtained at step S103 of FIG. 17 (i.e., the first operating position) in connection with the downstream-side robot 16 (the second robot 16B) is denoted by "e2". Then, the distance "d" between the position of the jig 86 (i.e., of the features 71A, 74B) at step S23 of FIG. 10 and the position of the jig 86 (i.e., of the features 74A, 74B) at step S104 of FIG. 17 is determined by Formula 8, with use of the values "e1" and "e2" as well as the scale "S" of the encoder of the conveyor sensor 20 determined by Formula 1.

$$d = S \cdot (e2 - e1) \quad \text{Formula 8}$$

Figure 18:
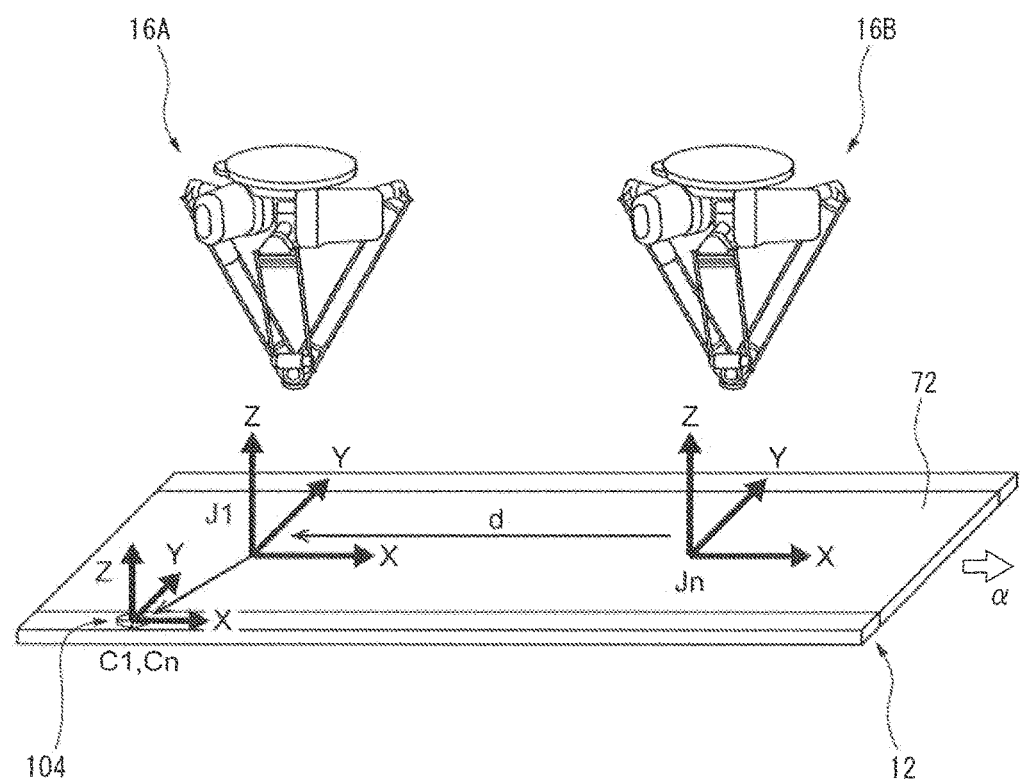
FIG. 18 is a view schematically showing an origin transformation step in the coordinate system setting procedure of FIG. 17.

A matrix "Cn" representing a conveyor coordinate system 66 with the origin defined by the position of the mark 104 viewed from the downstream-side robot 16 (the second robot 16B) is determined by Formula 9, in which, as shown in FIG. 18, "C1" denotes a matrix representing the conveyor coordinate system 66 determined at step S28 of FIG. 10 in connection with the farthest upstream-side robot 16 (the first robot 16A), "J1" denotes a matrix representing a coordinate system substantially corresponding to the conveyor coordinate system 66 except that the origin is not defined by the mark 104 but defined by the first coordinate 21 detected at step S23, "Jn" denotes a matrix representing a coordinate system obtained at the time of completing step S107 of FIG. 17 in connection with the downstream-side robot 16 (the second robot 165) and having the origin defined by the first coordinate P1 detected at step S104, and denotes a transformation matrix for providing an offset "−d" (minus d) for a matrix in the X-axis direction of the conveyor coordinate system 66.

$$Cn = Jn \cdot D \cdot J1^{-1} \cdot C1 \quad \text{Formula 9}$$

In this way, it is possible to set the conveyor coordinate system 66 with the origin defined by the coordinate of the mark 104, in connection with the downstream-side robot 16 (the second robot 16B), without detecting again or re-detecting the position of the mark 104. Even when the robot system 10 is provided with three or more robots 16, it is also possible to set a conveyor coordinate system 66 with the origin defined by the coordinate of the mark 104, without detecting the position of the mark 104, in connection with the robots other than the farthest upstream-side robot 16. Therefore, according to the coordinate system setting apparatus 100 having the above configuration and the coordinate system setting method analogous thereto, in addition to the aforementioned effects, it is possible to simplify and speed up the setting of conveyor coordinate systems in connection with a plurality of robots 16.

While various embodiments of the present invention are explained above, the present invention is not limited to the above-described embodiments. For example, in the robot system 10 shown in FIG. 1, in order to enable the robot 16 to perform the work of placing an article on an article tray (not shown) with respect to the discharge conveyor 18, a three-dimensional conveyor coordinate system (not shown) with an X-axis defined by the conveying operation direction β is set as a coordinate system for defining the position of the article tray on the discharge conveyor 18. Each of the coordinate system setting apparatuses 70, 100 shown in FIGS. 3 and 8 can perform a coordinate system setting method corresponding to the above-described various coordinate system setting methods and thereby set a conveyor coordinate system provided for the discharge conveyor 18. Note that, in this configuration, an object detecting section for detecting the position of the article tray may be configured by a non-contact detection unit (not shown), such as a phototube sensor, arranged adjacent to the discharge conveyor 18, instead of the image capturing section 28 of the above-described object detecting section 14.

While the invention has been described with reference to specific embodiments, it will be understood, by those skilled in the art, that various changes or modifications may be made thereto without departing from the scope of the following claims.

The invention claimed is:

1. A coordinate system setting method configured to set a conveyor coordinate system having a predetermined relationship with a base coordinate system of a robot, as a coordinate system for defining a position of an object on a conveyor, in a system having a configuration in which a position of the object conveyed by the conveyor is detected and the robot performs a work with respect to the object based on a detected position, the method comprising:
    providing a movable part of the conveyor with a plurality of features having a fixed positional relationship with each other, the movable part performing an object conveying operation;
    providing the robot with a sensor able to detect a position of each of the plurality of features in a non-contact manner;
    detecting positions of at least two features by the sensor, when the movable part is located at a first operating position, and acquiring detected positions as at least two first coordinates in the base coordinate system;
    making the movable part perform the object conveying operation from the first operating position toward a second operating position;
    detecting a position of at least one feature by the sensor, when the movable part is located at the second operating position, and acquiring a detected position as at least one second coordinate in the base coordinate system; and
    determining the conveyor coordinate system based on a direction of the object conveying operation, the at least two first coordinates and the at least one second coordinate.

2. The coordinate system setting method of claim 1, further comprising:
    setting a mark at a predetermined portion of an immovable part of the conveyor, the immovable part not performing the object conveying operation, a position of the mark being detectable by the sensor in a non-contact manner;
    detecting a position of the mark by the sensor, and acquiring a detected position as a third coordinate in the base coordinate system; and
    determining the conveyor coordinate system by using the third coordinate as an origin of the conveyor coordinate system.

3. The coordinate system setting method of claim 2, further comprising:
    detecting an orientation of the mark by the sensor; and
    finding a relationship between a detected orientation and an orientation of the base coordinate system and retaining the relationship.

4. The coordinate system setting method of claim 3, further comprising, after determining the conveyor coordinate system:
    re-detecting a position and an orientation, of the mark, by the sensor; and
    re-determining the conveyor coordinate system based on an amount of change in a position and an orientation, of the mark, in a case where a re-detected position and a re-detected orientation, of the mark, have changed from a position and an orientation, of the mark, detected when the conveyor coordinate system is determined.

5. The coordinate system setting method of claim 4, in which the system is provided with an object detecting section in a fixed positional relationship with respect to the robot, the object detecting section configured to detect a position of the object conveyed by the conveyor, the method further comprising:
  changing a positional relationship of the object detecting section with respect to the conveyor based on the amount of change in the position and the orientation of the mark.

6. The coordinate system setting method of claim 2, in which the system is provided with an object detecting section in a fixed positional relationship with respect to the robot, the object detecting section configured to detect a position of the object conveyed by the conveyor, the method further comprising, after determining the conveyor coordinate system:
  re-acquiring the first coordinates, the second coordinate and the third coordinate, and re-determining the conveyor coordinate system; and
  changing a positional relationship of the object detecting section with respect to the conveyor based on an amount of change in the conveyor coordinate system, in a case where the re-determined conveyor coordinate system has changed from the previously determined conveyor coordinate system.

7. The coordinate system setting method of claim 1, in which the system includes a plurality of robots, each robot configured to perform a work of picking up an arbitrary object in connection with a plurality of objects conveyed by the conveyor, the method comprising, when determining the conveyor coordinate system:
  determining a first conveyor coordinate system usable by a first robot disposed at an upstream side in a conveying operation direction of the conveyor; and
  determining a second conveyor coordinate system usable by a second robot disposed at a downstream side relative to the first robot in the conveying operation direction;
  the method further comprising:
    setting a mark at a predetermined portion of an immovable part of the conveyor, the immovable part not performing the object conveying operation, a position of the mark being detectable by the sensor in a non-contact manner,
    wherein, when the first conveyor coordinate system is determined, a position of the mark is detected by the sensor, a detected position is acquired as a third coordinate in the base coordinate system, and the third coordinate is used as an origin of the first conveyor coordinate system, and
    wherein, when the second conveyor coordinate system is determined, the third coordinate is transformed to a coordinate of an origin of the second conveyor coordinate system based on the first operating position of the movable part at a time when the first conveyor coordinate system is determined and based on the first operating position of the movable part at a time when the second conveyor coordinate system is determined.

8. A coordinate system setting apparatus configured to set a conveyor coordinate system having a predetermined relationship with a base coordinate system of the robot, as a coordinate system for defining a position of an object on a conveyor, in a system having a configuration in which a position of the object conveyed by the conveyor is detected and the robot performs a work with respect to the object based on a detected position, the apparatus comprising:
  a plurality of features having a fixed positional relationship with each other, the features being provided on a movable part of the conveyor, the movable part performing an object conveying operation;
  a sensor able to detect a position of each of the plurality of features in a non-contact manner, the sensor provided on the robot; and
  a processor configured to:
    make the sensor detect positions of at least two features, when the movable part is located at a first operating position, and acquire detected positions as at least two first coordinates in the base coordinate system;
    make the movable part perform the object conveying operation from the first operating position toward a second operating position;
    make the sensor detect a position of at least one feature, when the movable part is located at the second operating position, and acquire a detected position as at least one second coordinate in the base coordinate system; and
    determine the conveyor coordinate system based on a direction of the object conveying operation, the at least two first coordinates and the at least one second coordinate.

9. The coordinate system setting apparatus of claim 8, further comprising:
  a mark set at a predetermined portion of an immovable part of the conveyor, the immovable part not performing the object conveying operation, a position of the mark being detectable by the sensor in a non-contact manner; and
  wherein the processor is further configured to make the sensor detect a position of the mark and acquire a detected position as a third coordinate in the base coordinate system,
  wherein the processor is further configured to determine the conveyor coordinate system by using the third coordinate as an origin of the conveyor coordinate system.

10. A robot system comprising:
  a conveyor;
  an object detecting section configured to detect a position of an object conveyed by the conveyor, the object detecting section including a camera and an image processing unit;
  a robot configured to perform a work with respect to the object based on the position detected by the object detecting section; and
  a coordinate system setting apparatus configured to set a conveyor coordinate system having a predetermined relationship with a base coordinate system of the robot, as a coordinate system for defining a position of the object on the conveyor, in a system having a configuration in which a position of the object conveyed by the conveyor is detected and the robot performs a work with respect to the object based on a detected position, the apparatus comprising:
    a plurality of features having a fixed positional relationship with each other, the features being provided on a movable part of the conveyor, the movable part performing an object conveying operation;
    a sensor able to detect a position of each of the plurality of features in a non-contact manner, the sensor provided on the robot; and a processor configured to:
- make the sensor detect positions of at least two features, when the movable part is located at a first operating position, and acquire detected positions as at least two first coordinates in the base coordinate system;
- make the movable part perform the object conveying operation from the first operating position toward a second operating position;
- make the sensor detect a position of at least one feature, when the movable part is located at the second operating position, and acquire a detected position as at least one second coordinate in the base coordinate system; and
- determine the conveyor coordinate system based on a direction of the object conveying operation, the at least two first coordinates and the at least one second coordinate.

* * * * *